Dec. 22, 1942.    G. FAST    2,306,048
COMBINED RADIAL AND THRUST BEARING UNIT
Filed Nov. 17, 1939    12 Sheets-Sheet 1
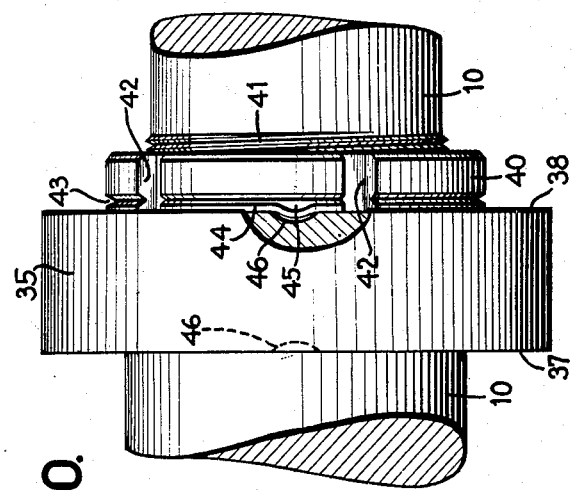
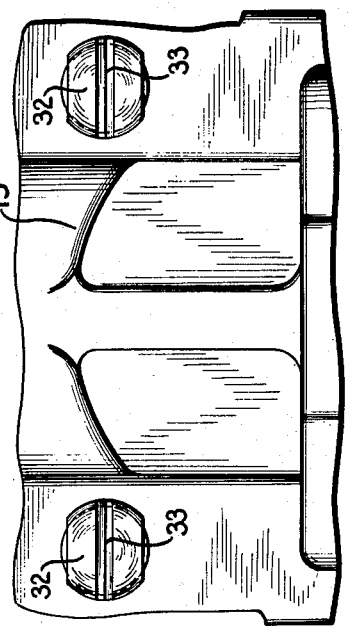
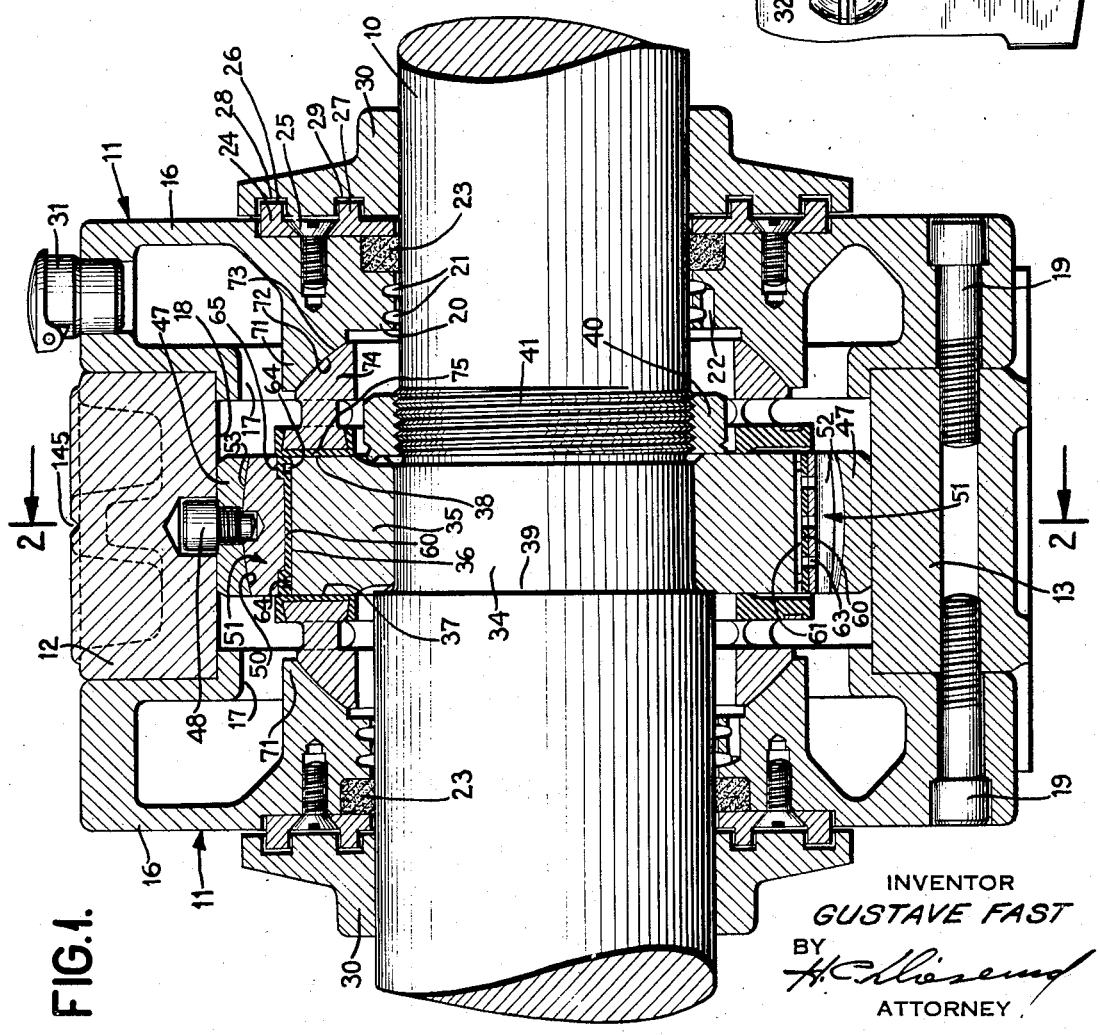
INVENTOR
*GUSTAVE FAST*
BY
ATTORNEY Dec. 22, 1942.     G. FAST     2,306,048
COMBINED RADIAL AND THRUST BEARING UNIT
Filed Nov. 17, 1939     12 Sheets-Sheet 2

INVENTOR
*GUSTAVE FAST*
BY
ATTORNEY

Dec. 22, 1942.  G. FAST  2,306,048
COMBINED RADIAL AND THRUST BEARING UNIT
Filed Nov. 17, 1939  12 Sheets-Sheet 4

INVENTOR
*GUSTAVE FAST*
BY
*H.C. Chisem*
ATTORNEY

Dec. 22, 1942.　　　　　G. FAST　　　　2,306,048
COMBINED RADIAL AND THRUST BEARING UNIT
Filed Nov. 17, 1939　　　12 Sheets-Sheet 5

INVENTOR
*GUSTAVE FAST*
BY
ATTORNEY

Dec. 22, 1942.   G. FAST   2,306,048
COMBINED RADIAL AND THRUST BEARING UNIT
Filed Nov. 17, 1939   12 Sheets-Sheet 6

INVENTOR
*GUSTAVE FAST*
BY
ATTORNEY

Dec. 22, 1942.　　　　　G. FAST　　　　　2,306,048
COMBINED RADIAL AND THRUST BEARING UNIT
Filed Nov. 17, 1939　　　12 Sheets-Sheet 7

INVENTOR
*GUSTAVE FAST*
BY
ATTORNEY

Dec. 22, 1942.                G. FAST                2,306,048
              COMBINED RADIAL AND THRUST BEARING UNIT
              Filed Nov. 17, 1939          12 Sheets-Sheet 8
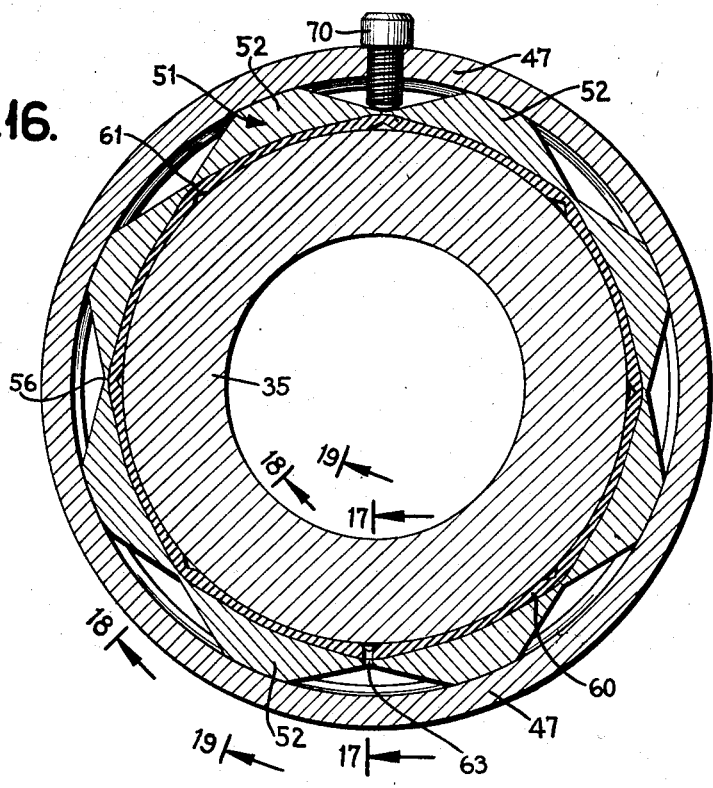
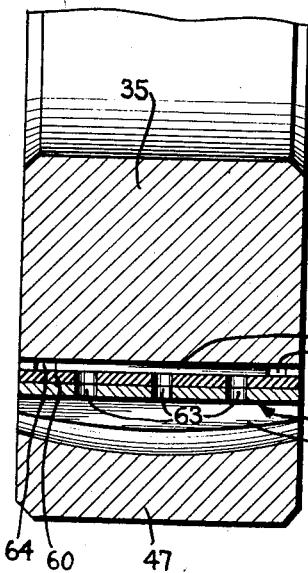
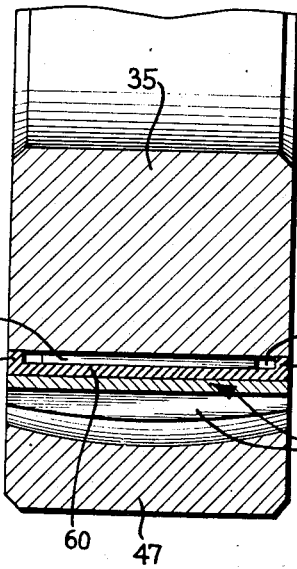
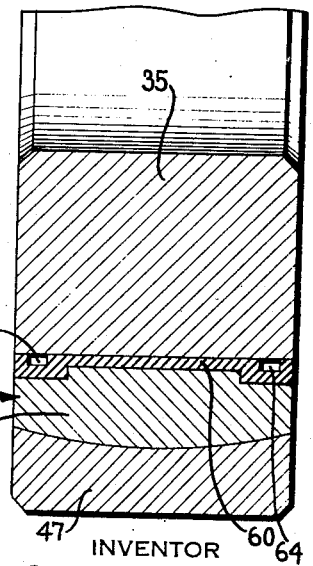
INVENTOR
GUSTAVE FAST
BY
ATTORNEY Dec. 22, 1942.                    G. FAST                    2,306,048
                 COMBINED RADIAL AND THRUST BEARING UNIT
                   Filed Nov. 17, 1939        12 Sheets-Sheet 9
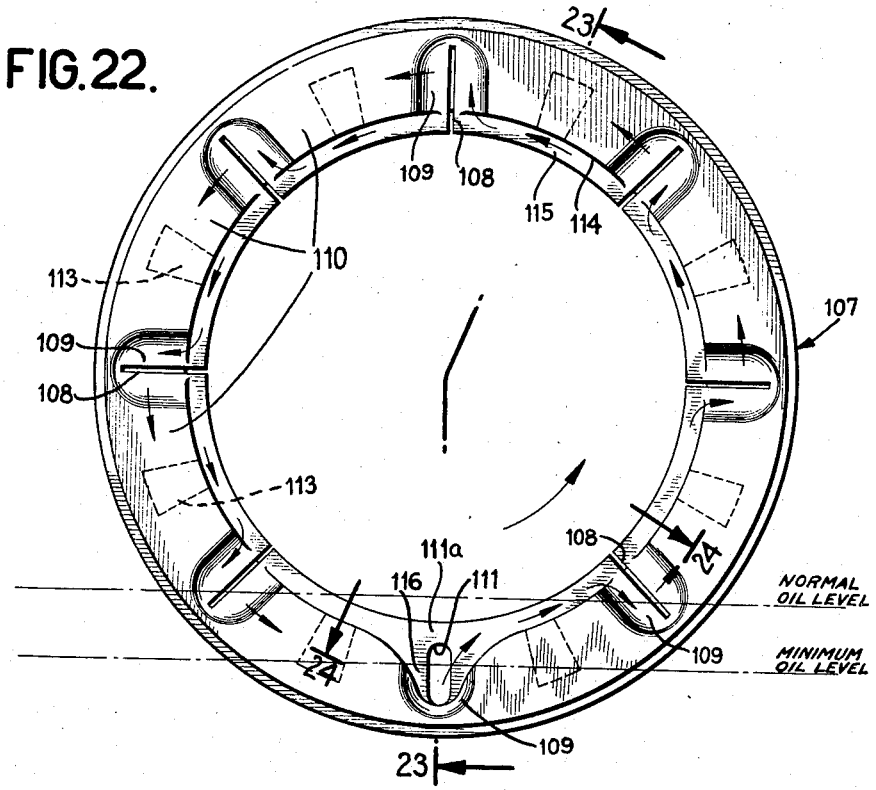
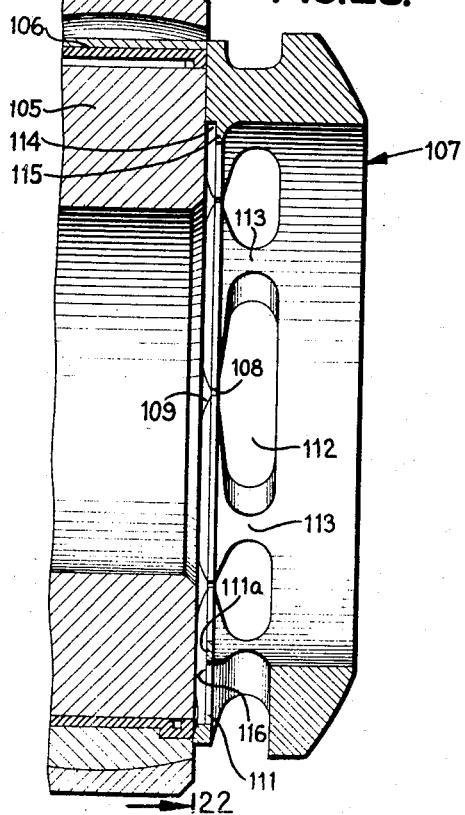
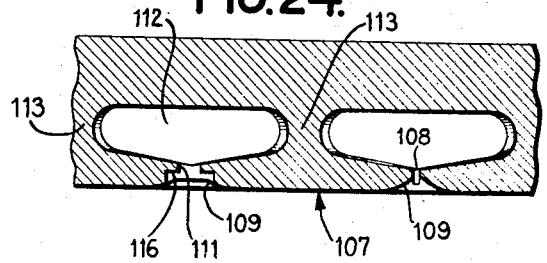
INVENTOR
*GUSTAVE FAST*
BY
ATTORNEY Dec. 22, 1942.     G. FAST     2,306,048
COMBINED RADIAL AND THRUST BEARING UNIT
Filed Nov. 17, 1939     12 Sheets-Sheet 10
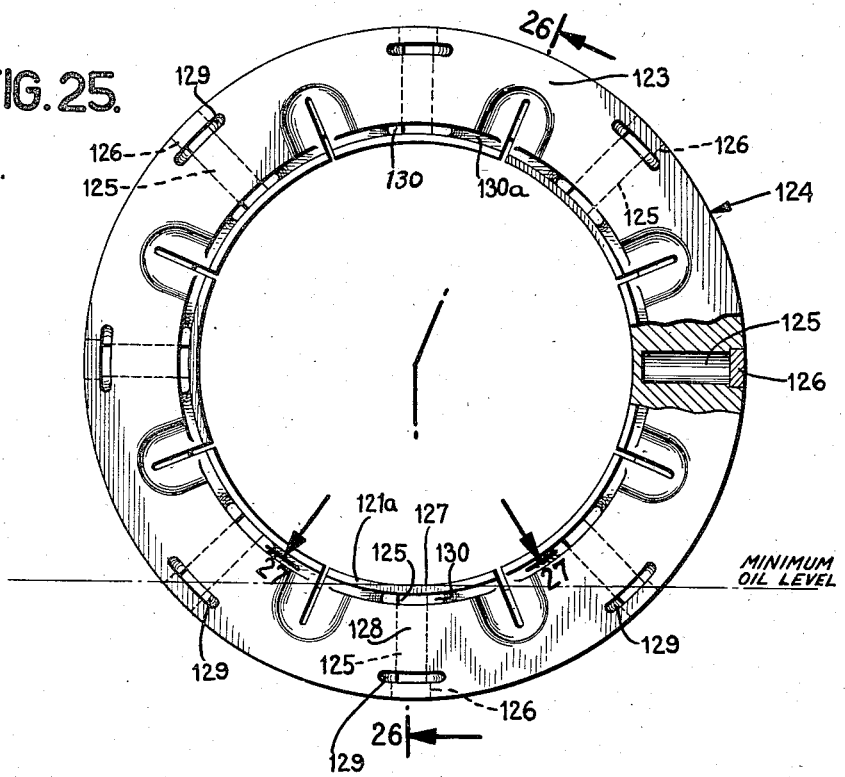
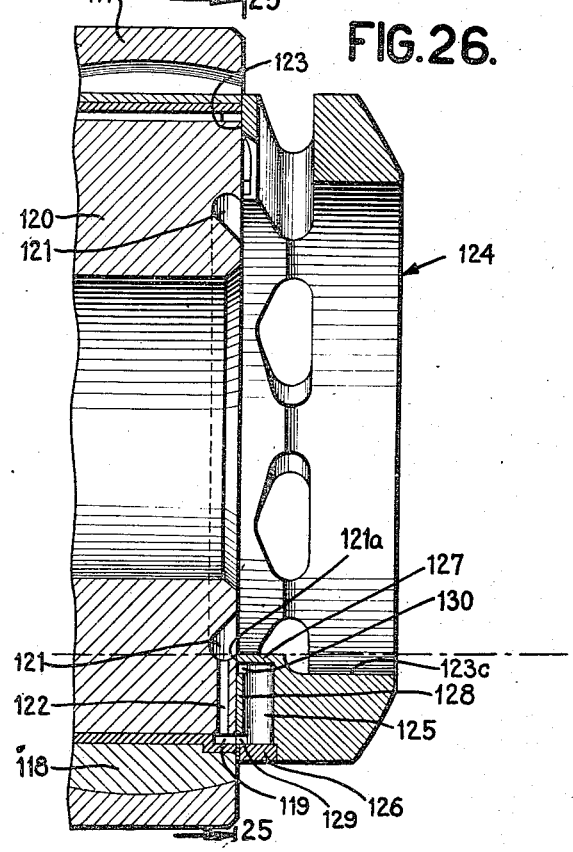
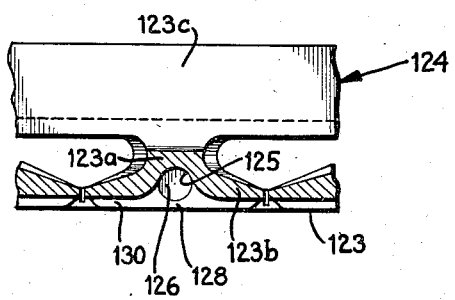
INVENTOR
*GUSTAVE FAST*
BY
ATTORNEY

INVENTOR
GUSTAVE FAST
BY
ATTORNEY

Dec. 22, 1942.  G. FAST  2,306,048
COMBINED RADIAL AND THRUST BEARING UNIT
Filed Nov. 17, 1939  12 Sheets-Sheet 12

INVENTOR
GUSTAVE FAST
BY H. C. Wiesing
ATTORNEY

Patented Dec. 22, 1942

2,306,048

UNITED STATES PATENT OFFICE 2,306,048

COMBINED RADIAL AND THRUST BEARING UNIT

Gustave Fast, Annapolis, Md., assignor to The Fast Bearing Company, Annapolis, Md., a corporation of Maryland Application November 17, 1939, Serial No. 304,916

36 Claims. (Cl. 308—73)

This invention relates to bearings and more particularly to plain bearings of the type in which the relatively rotating members have relatively sliding surfaces so constructed and arranged that multiple, wedge-shaped lubricant films are formed between such surfaces to enable the carrying of high, specific pressures, to provide low friction losses, and to substantially eliminate wear.

An object of the invention has been to produce a simple and compact bearing unit of the character mentioned, in which effective provision is made for the reception of both radial and thrust loads. Toward this end the invention contemplates the employment of separate but inter-related devices, each designed especially to receive most effectively the particular type of load to which it is subjected. Thus, improved means, of simple, durable and inexpensive character, are provided for dealing most efficiently with radial loads, and other means of similar character are provided for dealing most efficiently with thrust loads. These separate means and the enclosing housing are so arranged and inter-related as to insure an adequate supply of lubricant to all of the relatively sliding surfaces and the rapid creation of the desired wedge-shaped films between these surfaces. The construction is such, furthermore, as to enable speedy assembly and disassembly of the parts.

A feature of the invention is the construction of the entire unit, including the housing, of comparatively few parts, each of simple form capable of large-scale and economical production. The radial bearing means comprises but three parts, including a hub mounted on the journal and a sleeve carried by the housing. In fact the hub might, if desired, be formed as an integral part of the shaft and the outer sleeve might be an integral part of the housing so that only one separate piece is required for the radial bearing. All of the three elements of the bearing are of simple configuration and readily assembled. They are preferably so formed as to provide a universal action, thus permitting the axes of the shaft and housing to tilt with respect to each other without disturbing the efficiency of the bearing. The full and direct resistance to thrusts requires but one additional member for each direction in which the thrusts are transmitted. These thrust-receiving members and the housing are likewise readily adapted to permit relative angling between the shaft and housing.

Another feature of the invention is the provision for adequate lubrication without, however, inducing excessive circulation of the oil, which would cause an unnecessary energy loss and would also tend to whip the oil into a foam, which is ineffective for lubrication purposes. In this connection, moreover, the construction is such that the rotating members of the unit are provided with smooth, unbroken surfaces which will not present shoulders or other abrupt formations having a tendency to splash and whip the oil.

The improved unit is compact and of such dimensions as to enable it to readily replace standard existing types of bearings. The radial bearing features, for example, may be readily given the same standardized dimensions as ball and roller bearings prescribed for given loads and installations.

Other objects, features and advantages of the invention will appear from the illustrative examples of the same, which will now be given in conjunction with the accompanying drawings, in which:

Fig. 1 is a longitudinal section through the bearing unit, partly vertical and partly at an angle to the vertical, taken along the line 1—1 of Fig. 2.

Fig. 16 is a similar, transverse, central, vertical section through a radial bearing, illustrating a further modification.

Figs. 17, 18 and 19 are enlarged details in section through the bearing of Fig. 16, taken, respectively, along the lines 17—17, 18—18 and 19—19 of Fig. 16.

Fig. 20 is a plan view of a portion of the shaft, illustrating the mounting thereon of a journal hub, which is partly broken away.

Fig. 21 is a fragmentary view, in elevation, of a portion of the housing as viewed from one side.

Fig. 22 is a face view of a modified form of thrust bearing member showing another arrangement for distributing the lubricant.

Fig. 23 is a partial section taken axially through a bearing utilizing the thrust member of Fig. 22, along the line 23—23 of Fig. 22.

Fig. 24 is a section through a portion of the thrust member of Fig. 22, taken along the curved line 24—24 of Fig. 22.

Fig. 25 is a face view of a further modified form of thrust member constructed in accordance with the invention.

Fig. 26 is a partial, axial, sectional view through a portion of a bearing embodying the thrust member of Fig. 25, taken along the line 26—26 of Fig. 25.

Fig. 27 is a detail view in section through a portion of the thrust member of Fig. 25, taken along the curved line 27—27 of Fig. 25.

Figure 28:
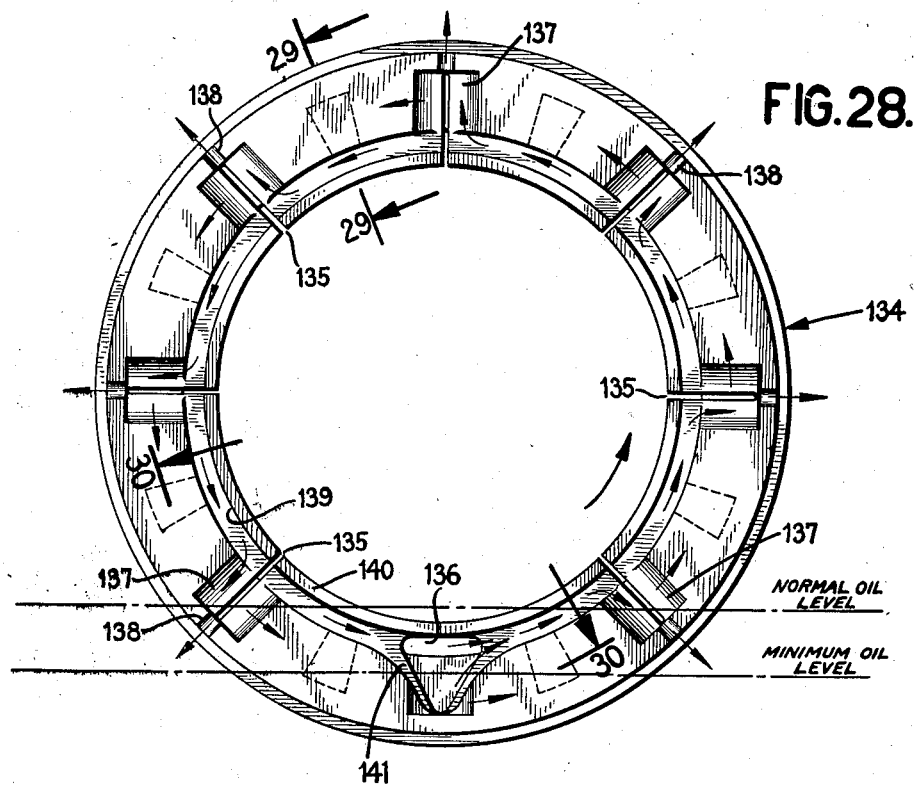

Fig. 28 is a face view of a still further modified form of thrust member embodying certain improved lubrication features.

Figure 29:
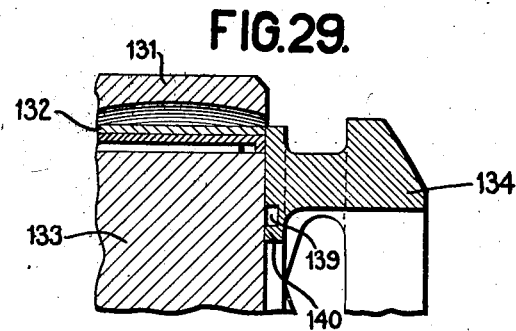

Fig. 29 is a fragmentary section through a portion of a bearing unit embodying the thrust member of Fig. 28, taken along the line 29—29 of Fig. 28.

Figure 30:
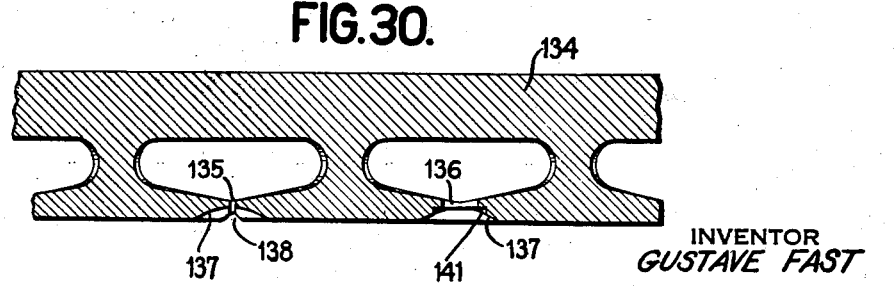

Fig. 30 is a detail in section along the line 30—30 of Fig. 28, and

Figs. 31 to 34, inclusive, are diagrammatic views illustrating the force conditions involved between the thrust member and housing in different constructions.

Figure 2:
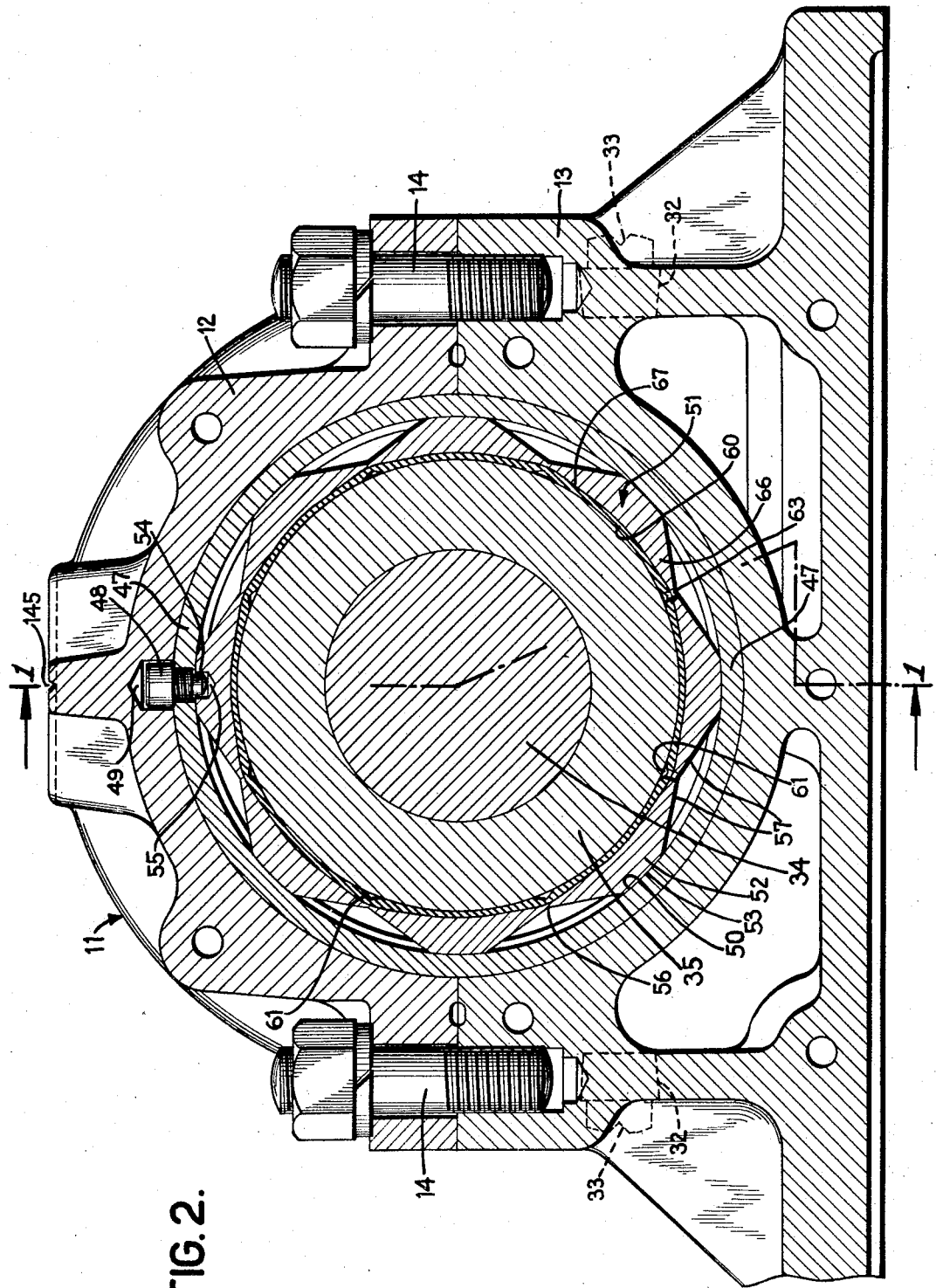
Fig. 2 is a transverse, vertical section through the unit along the line 2—2 of Fig. 1.
Figure 3:
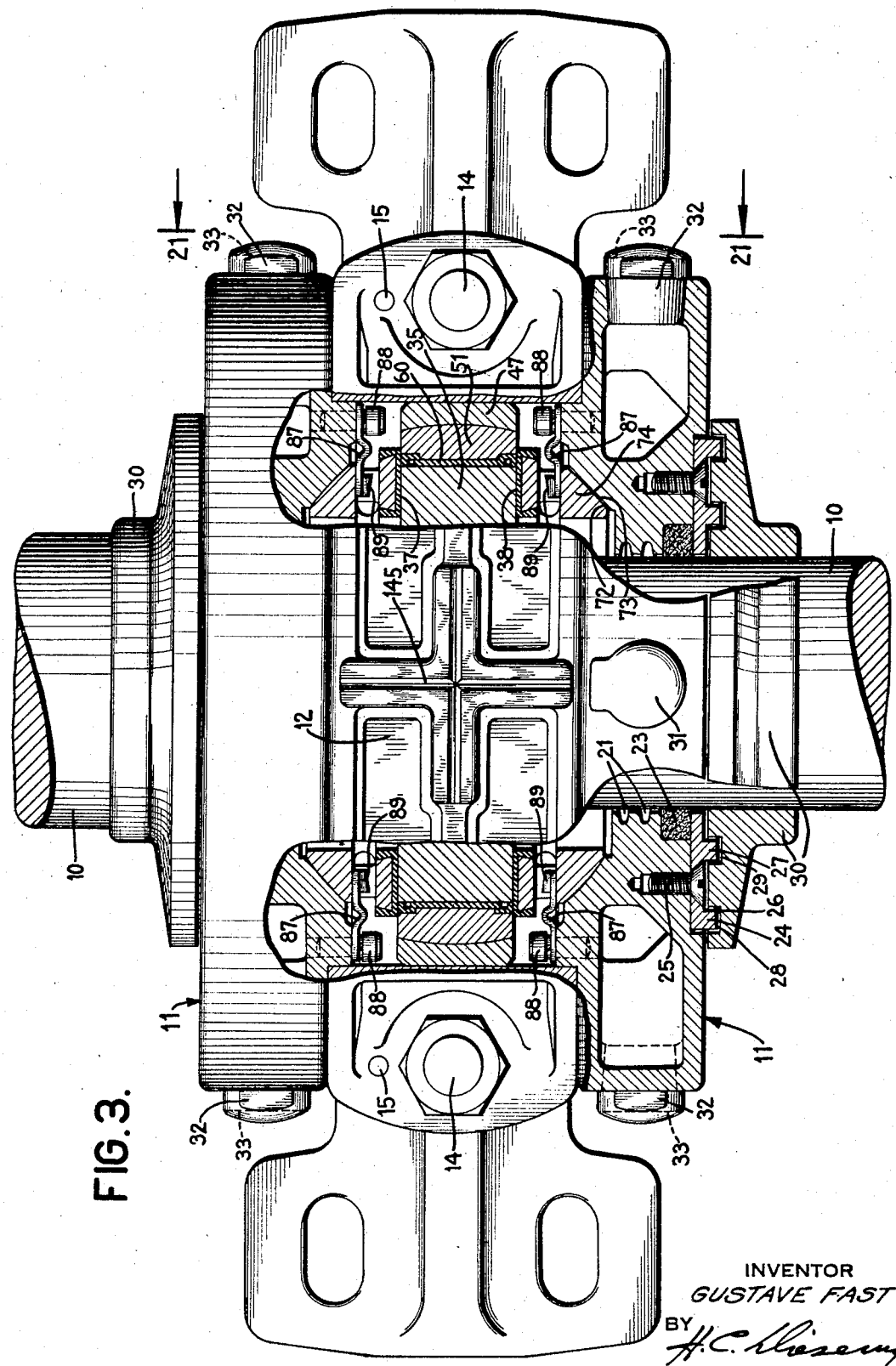
Fig. 3 is a top plan view of the unit, portions of the housing being broken away to disclose the interior construction which is partially indicated in section.

Referring now to the drawings, the invention has been illustrated in Figs. 1 and 2 as applied to a bearing for a shaft 10, which extends through a housing 11, adapted to be supported, in any suitable way, by a foundation or by an appropriate supporting structure forming part of the apparatus with which the bearing is associated. The housing is preferably formed in three sections and is so constructed as to provide an oil reservoir at its bottom of maximum capacity. At its top the housing is preferably provided with a number of projections or ribs adapted to readily dissipate heat. The central section is formed in two parts, i. e., a cap 12 and a base 13, which are secured together by means of studs 14 having screw-threaded engagement with the base and having a nut and lock washer to retain the cap. Dowel pins 15 (Fig. 3) may be provided, if desired, to insure the correct alinement of the two parts. At each side or end of the central section there is provided an end bell 16, each bell being a complete annular member which substantially closes its end of the housing around the shaft. As best shown in Fig. 1, the end bells are preferably formed with inwardly extending flanges 17 providing annular shoulders adapted to cooperate with the inner cylindrical surface 18 of the central section of the housing formed by the parts 12 and 13. The several sections and parts of the housing are so constructed and assembled as to provide a tight fit, preventing the leakage of oil from the interior of the housing. Any suitable means, such as the screws 19 shown in Fig. 1, may be provided for securing the end bells to the central section of the housing.

Suitable means are employed at the ends of the housing for preventing the escape of the lubricant along the shaft. For this purpose the end bells may be formed with inward extensions 20 having grooves 21 adapted to receive any oil which attempts to escape along the shaft and is thrown from the latter as it revolves. This oil is returned to the reservoir in the housing by means of a passage 22 communicating with the bottoms of the grooves. In a recess in the outer face of each of the members 16, there is provided suitable packing or sealing material 23, such as felt, adapted to keep out dust and also assist in retaining the lubricant. The sealing material 23 is retained in the recess by means of a plate 24 secured to the end bell in any convenient way, as by means of screws 25. The plate 24 is preferably provided with a pair of annular projections 26 and 27 extending axially of the shaft. These projections are received by corresponding recesses 28 and 29 formed in the face of a disc 30 secured to the shaft and adapted to rotate with the latter. Any dust seeking to enter the housing must thus traverse an intricate labyrinth before reaching the sealing material 23. The danger of the entry of the dust into the housing is thereby reduced to a minimum. It will be noted that a slight clearance is provided between the various surfaces on the housing, or on members secured to the housing, and the shaft, or members secured to the latter. This is, of course, with the exception of the packing 23, which is in intimate contact with both the shaft and the end bells of the housing but is capable of yielding whenever necessary. Provision is thus made for slight angling movements of the shaft with respect to the housing to permit and take care of slight misalinement of the axes of the shaft and housing. At the same time effective provision is made at all times against the escape of the lubricant along the shaft and the ingress of dust.

The lubricant may be introduced into the housing through an inlet 31 provided at the top of one of the end bells 16 and the level of the lubricant within the housing may be constantly noted through transparent plugs 32 inserted in the front and rear walls of the end bells. These transparent plugs may be retained in any suitable way, as by means of an appropriate cement or adhesive. The plugs and the openings in which they are received may be splined, if desired, to predetermine a definite relation. A horizontal groove or notch 33 extending across the face of the transparent plug may serve to indicate either the mean working level of the lubricant within the housing or the minimum level which may be safely employed. As will be later explained, the level of the lubricant is subject to considerable variation without interfering with the adequate supply of the lubricant to the bearing surfaces.

On a reduced portion 34 of the shaft 10 there is mounted a journal hub 35 formed preferably of hardened and tempered steel and having a strictly cylindrical, outer face 36 and substantially smooth, flat end faces 37 and 38. These bearing surfaces of the journal hub are preferably ground. The journal hub may be retained on the shaft in any suitable way but is preferably shrunk or pressed on. The friction between the hub and shaft will be great enough to insure their rotation in unison but to enable the hub to resist thrusts more effectively, it may be held against a shoulder 39 on the shaft by means of a clamping ring or nut 40 engaged with threads 41 on a reduced portion of the shaft. The clamping ring may be formed with a series of transverse grooves 42 for the reception of a spanner wrench, which may be employed in tightening the ring. An annular groove 43, extending around the ring adjacent its inner face, provides a relatively thin, weakened section 44 which may be peened or staked inwardly at spaced points, such as indicated at 45 in Fig. 20, into slight depressions 46 provided in the face of the journal hub. This serves to lock the hub and clamping ring against relative rotation. If desired, the hub might be formed integral with the shaft itself.

Surrounding the journal hub, and spaced some distance therefrom, there is provided an outer bearing sleeve 47, whose outer periphery is preferably cylindrical and adapted to provide a close fit with the inner cylindrical surface 18 of the central section of the housing. Any appropriate means may be provided for preventing rotation of the ring 47 with respect to the housing and for determining its location axially of the housing. Such means may, for example, be in the form of a plug 48 having a screw-threaded portion secured in a screw-threaded opening in the ring 47 and having its enlarged head adapted to fit in a recess 49 in the top of the portion 12 of the bearing housing. If desired, simple friction might be relied upon to retain the sleeve in the housing or a flattened surface on the sleeve might cooperate with a similar flattened surface in the housing to prevent relative turning. The inner surface 50 of the sleeve is preferably of spherical form, although it may, if desired, be either cylindrical or conical. As will be explained, the advantage of the spherical form is that it provides a desired universal action which enables the bearing to function properly even though the shaft and housing may be somewhat out of alinement.

Figure 13:
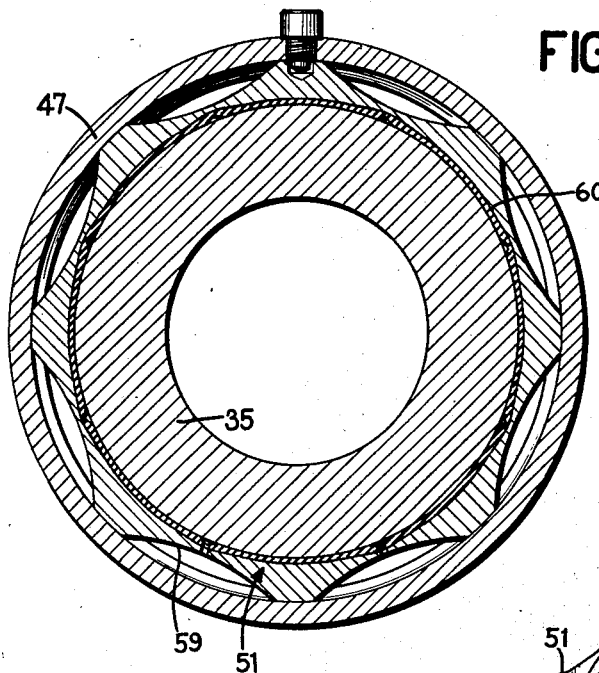
Fig. 13 is a transverse, central, vertical section through a modified form of radial bearing.
Figure 15:
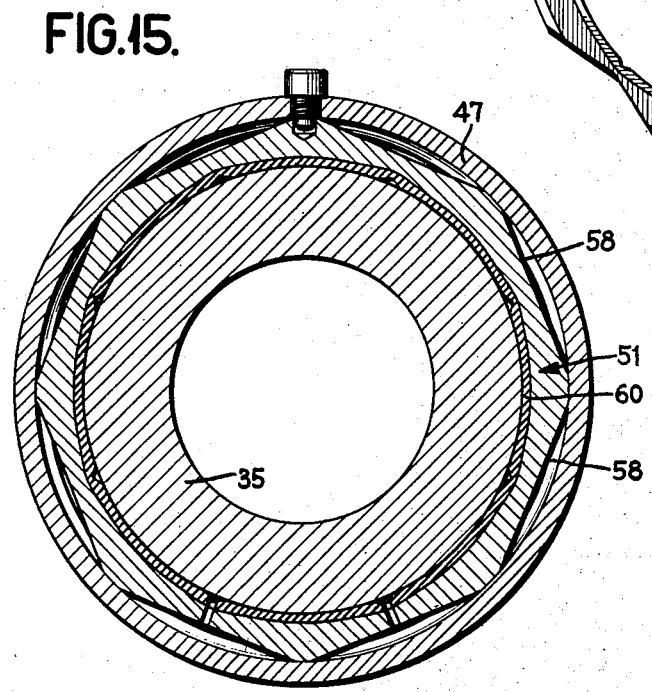
Fig. 15 is a transverse, central, vertical section through another form of radial bearing.

Between the journal hub 35 and the outer bearing sleeve 47 there is mounted an inner bearing member or sleeve 51 formed preferably of steel. The outer periphery of this member is of such form as to provide a series of high or protruding portions 52, the outer surfaces 53 of which are portions of a sphere. These surfaces 53 are adapted to fit snugly within the spherical surface 50 of the outer bearing sleeve. The outer and inner sleeves are not intended to partake of any substantial, relative rotation but the spherical form of the surfaces 50 and 53 allows for an appropriate, universal action between the two sleeves. A downward extension 54 of the screw plug 48 may cooperate with a recess 55 in one of the projections 52 to limit the relative movement between the two sleeves and to insure the appropriate positioning of the inner sleeve with relation to the top and bottom of the bearing. Intermediate the projecting portions 52 of the sleeve 51 the outer surface of the sleeve is cut away in any suitable manner to provide weakened sections 56, serving to divide the sleeve into a series of separate segments or shoes and enabling the several portions of the sleeve to be readily flexed with respect to each other. As shown in Fig. 2, these weakened sections may be formed by a series of plane surfaces 57 angled inwardly from the outer spherical face of the sleeve toward the points to be weakened. Such plane surfaces may readily be machined in the outer face of the sleeve and serve admirably for the intended purpose. If the material of which the sleeve is formed and its dimensions are such that less weakening is required to permit it to flex in the desired manner, the outer surface of the sleeve between the projecting portions 52 may be simply formed as a series of flat faces 58, as shown in Fig. 15. The outer surface of the sleeve will then, in cross-section, be substantially a regular polygon, such as an octagon or hexagon, with well rounded corners. As another alternative, the desired weakening may be produced by a series of scallops or cuts of arcuate formation, as indicated at 59 in Fig. 13. This is a simple and expeditious way of dividing the sleeve into a series of segments having weakened, flexible ends.

To the inner face of the member 51 there is preferably applied an anti-friction lining or coating 60 formed of Babbitt metal or a high-lead bronze or the like. The inner surface of this Babbitt lining is normally substantially cylindrical and of only slightly greater diameter than the outer diameter of the journal hub 35 so as to provide a good sliding fit with respect to the latter. At the weakened points 56 the inner face of the lining is provided with transversely extending grooves 61. These grooves, however, preferably do not extend completely across the lining but terminate slightly inwardly of the edges, as shown in Fig. 18, thus providing portions 62 which serve to close off the ends of the grooves. But this does not apply to the two lowermost grooves of Fig. 2. These grooves, which are below the level of the oil, extend completely across the member 51 (see Figs. 1 and 17) so as to allow the free entry of the lubricant. The two lowermost grooves are also in communication with the main supply of lubricant through a series of openings 63 extending through the Babbitt lining and through the weakened portion of the member 51 itself. The lubricant taken in through the ends of the lowermost grooves 61 and through the openings 63 communicating with these grooves is quickly delivered around the entire bearing through annular grooves 64 extending around the inner face of the Babbitt lining adjacent the two edges thereof. The inner surface of the steel base member of the sleeve 51 is preferably grooved or cut away adjacent the two ends of the sleeve to allow for a greater thickness of Babbitt adjacent these ends and thus enable the formation of the grooves 64 without unduly reducing the thickness of the Babbitt lining. These annular grooves communicate with the entire series of transverse grooves 61 and thereby insure an adequate supply of the lubricant to all of the points where it is required.

In the operation of the shaft, as the journal hub 35 is rotated within the Babbitt lining of the member 51, a viscous pump action is created which will cause an ample flow of lubricant and will quickly cause a series of oil films to be developed between the journal hub and lining. In forming these oil films the end 66 of one of the sections of the sleeve 51 (Fig. 2) will be flexed outwardly. This is under the assumption that the shaft is rotated in a counterclockwise direction (Fig. 2). The outward flexing of the portion 66 will cause the main part of the related section of the member 51 to be tilted to a slight extent. This will produce a desired wedge-shaped pocket between the section and the journal hub for the formation of a wedge-shaped film. It will be understood that the flexibility of the member 51 at the weakened sections is such that the leading portion 66 of a section of the sleeve will be permitted to bend outwardly to a slight extent to form a convergent space while the opposite end, beyond the point 67 which may be considered the virtual fulcrum of the tilting action of the section, forms a divergent space. At the mouth of each of the divergent spaces, i. e., at the thinnest points of the sleeve, a vacuum or negative pressure is created which serves to suck in the lubricant at these points and insures an adequate supply to form the load-sustaining films in the convergent spaces provided by the succeeding section of the sleeve. The openings 63 in the bottom portion of the sleeve should always be immersed in the body of lubricant in the housing so as to draw the oil from this body. The negative pressure created at the other thin points around the sleeve will simply draw the oil from the grooves 64. It is important to seal the ends of the transverse grooves 61 which are above the oil level by means of the flanges 62 and the oil in the grooves 64 and it is also important to omit the openings 63 at these transverse grooves so that the negative pressure mentioned will not serve to suck in air and destroy the film-producing value of the lubricant. If desired, the grooves 64 may be so formed that their sides will converge toward the top of the member 51. This will serve to increase the pressure of the oil in the grooves.

Figure 14:
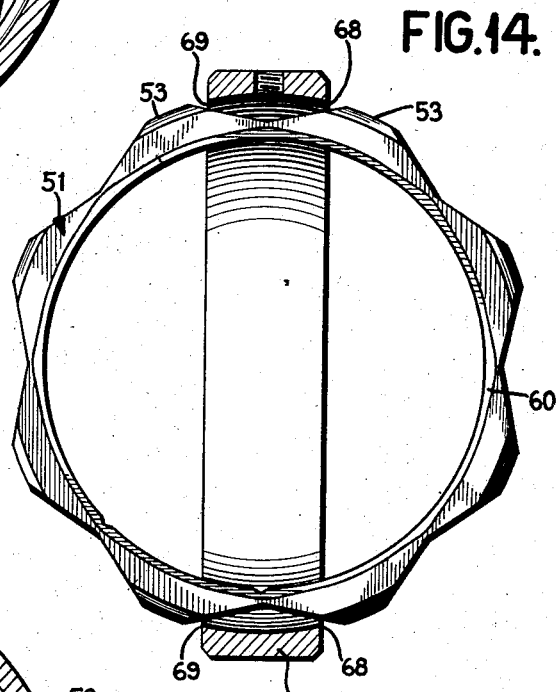
Fig. 14 is a view illustrating the mode of assembly of certain of the elements of the radial bearing illustrated in Figs. 1 and 2.

Due to the form of the member 51, particularly when it is provided with an even number of projecting portions 52, it may be readily assembled with the outer ring 47 without modifying the cooperating surfaces of these members. If the member 51 is turned to the position indicated in Fig. 14, it may be passed through the outer sleeve 47. The smallest diameter of the sleeve 47, at the corners 68 and 69, is just sufficient to permit the inner sleeve to be passed through when it is held in the position indicated in Fig. 14. The cut-out portions between the adjacent surfaces 53 bring this about.

In lieu of retaining the member 51 in the position indicated in Figs. 1 and 2, in which one of the projections 52 is directed vertically downward and another is directed vertically upward, the member may be turned, as shown in Fig. 16, to a position in which one of the weakened sections is located immediately beneath the axis of the journal hub and another of such weakened sections is located directly above the axis of the journal hub. With this arrangement a stud 70 may be provided, in lieu of the stud 48, which simply passes through the ring 47 and into the space between two adjacent projections 52 of the member 51. The head of the stud 70 will, of course, cooperate with the recess 49 in the cap 12 of the central section of the housing. When the member 51 is so positioned, the holes 63 should be provided through only that weakened section of the member 51 which is directly beneath the axis of the journal hub. Adequate lubrication will be supplied to the bearing through this single series of openings and the associated grooves 64 and 61. An advantage of this construction is that it serves to supply the lubricant to the bearing surfaces from the lowest possible point.

The end bells 16 of the housing are each provided with an annular, inward projection 71 adapted to receive the thrusts of the journal hub 35. Each of these annular projections is formed with a spherical seat 72 adapted to cooperate with a corresponding spherical surface 73 on a thrust bearing member 74. These spherical seats and surfaces have their centers of curvature along the axis of the housing but not necessarily at the center of the journal hub. The best condition for the self-alining action is obtained when the surfaces 72 and 73 are disposed at about 45° to the axis of the housing, but, as will be later explained, it is sometimes preferable to sacrifice this most favorable condition for self-alinement in order to minimize certain distorting forces acting upon the thrust member. It is sometimes desirable, for example, to increase the specified angle to about 60°. The inner surface 75 of the member 74 bears against the side surface 38 of the journal hub and the side of the inner bearing sleeve 51, which it thus assists in properly locating. As will be presently explained, the surface 75 is adapted to produce a plurality of lubricant films in conjunction with the surface 38. Moreover, it assists in sealing or retarding the side leakage from the films formed between the sleeve 51 and the outer circumference of the journal hub.

Figure 4:
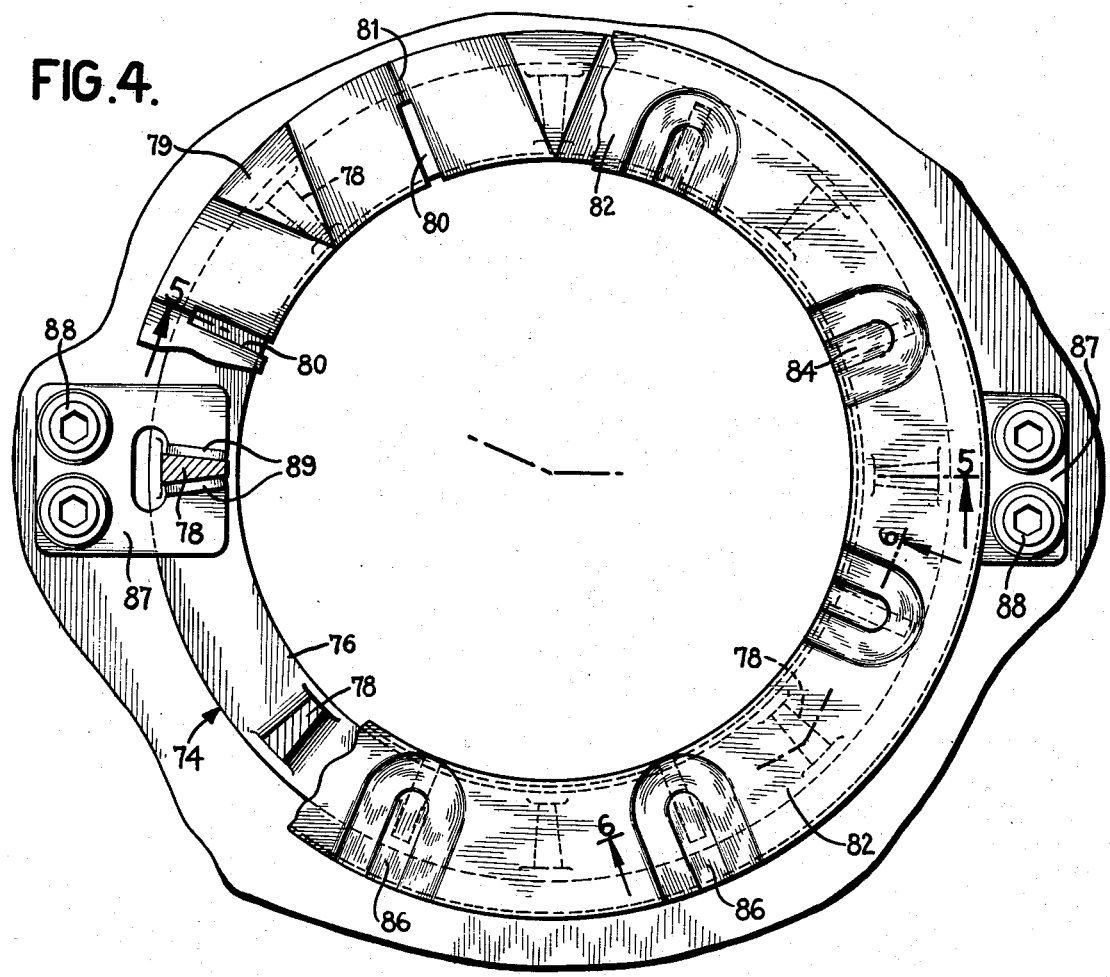
Fig. 4 is a face view of a thrust bearing member embodied in the unit, portions of the member being broken away to illustrate its construction more clearly and a portion of the housing being shown in association with the member to indicate its mode of assembly.
Figure 5:
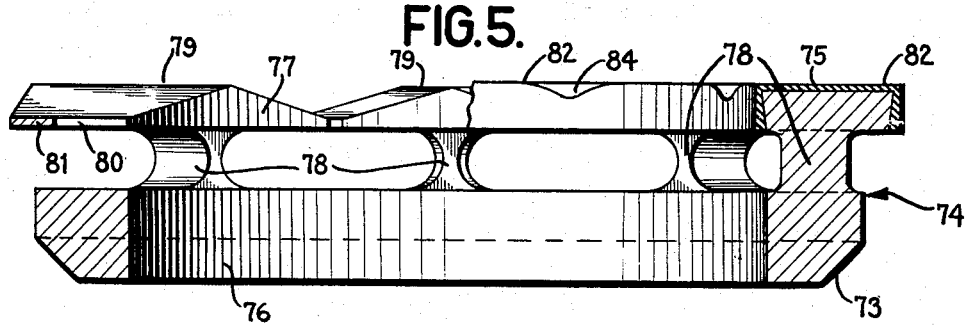
Fig. 5 is a section through the thrust bearing member taken along the line 5—5 of Fig. 4.
Figure 6:
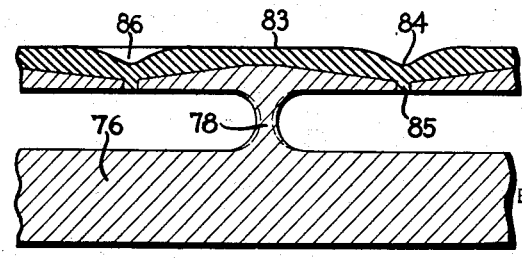
Fig. 6 is a fragmentary section through the thrust bearing member, taken along the line 6—6 of Fig. 4.

Referring particularly to Figs. 4, 5 and 6, the members 74, which are interchangeable, i. e., are identical for the two sides of the journal hub, comprise a base ring 76, which carries the spherical surface 73, and an annular, flexible portion 77 in the nature of a plurality of interconnecting shoe segments connected with the base by means of integral, flexible necks 78. The thrust members may be formed of steel or the like with a lining or coating of Babbitt or similar good bearing material on the bearing surface thereof, or they may be formed entirely of a resilient material, such as bronze, having good bearing qualities in itself. If the steel and Babbitt metal construction is used, the face of the steel base of the portion 77, which lies opposite the surface 38 on the journal hub, is of undulatory form, or provided with a series of crests and depressions, as best indicated in Figs. 5 and 6. This is necessary in order to give the member the desired flexibility and, at the same time, the required strength to support the load. A series of high portions 79 are provided at spaced points directly over the necks 78. These high portions, as shown in Fig. 4, are preferably in the form of flat, triangular surfaces. From these triangular surfaces sloping plane surfaces are preferably provided, these intersecting at the bottom of a series of troughs formed midway between the necks 78. Due to the thinness of the metal at the bottom of these troughs, the portion 77 of the thrust member is relatively weak at these points and subject to rather easy flexure. However, to increase the flexibility of the sections, radial notches 80 are provided, these extending about two-thirds of the way across the portion 77 from its inner periphery at the base of each of the troughs, thus leaving only a relatively small neck 81 of the steel or similar base metal to connect the several sections of the ring.

Over the outer surface and edges of the base material of the portion 77, a lining or layer of Babbitt 82 is provided. The surface of this lining which cooperates with the surface 38 of the journal hub is substantially flat, as indicated by the portion 83 in Fig. 6, but is provided toward its inner periphery with a series of spaced depressions 84. These are disposed over the slots 80 in the base material, the Babbitt metal extending into these slots as indicated at 85 in Fig. 6. In the lower part of the portion 77 there is provided, in lieu of the depressions 84, a pair of depressions 86 in the Babbitt lining which are directed radially outward to the outer periphery of the portion 77. If the associated radial bearing sleeve 51 is arranged as indicated in Fig. 2, and is divided into the same number of sections as the member 74, the depressions 86 will be in line with and communicate with the two lowermost grooves 61 which extend completely across the Babbitt lining of the member 51.

The lubricant is supplied to this thrust bearing as follows: If the lubricant is at a level above the bottom of the inner periphery of the thrust member, it is thrown by centrifugal force from the side of the journal hub into the radial grooves 84. However, if the oil level drops below the inner periphery of the thrust member, the lubricant in the passages formed by the depressions 86 is picked up by the thrust faces 38 of the rotating journal hub and spread over the entire surface of the thrust bearing member by a viscous pump action. It will be understood that as the journal hub rotates, oil is forced between the surfaces 38 and 83 from the depressions 84 and 86 and this oil will cause the several sections of the portion 77 of the thrust member, between the slots 80, to flex and tilt and produce the desired wedge angles. The formation of the wedge-shaped pockets results from the wedging action of the lubricant which bends or flexes the weakened ends of the several sections and the flexible necks 78. Due to the arrangement of the slots 80, the sections will bend somewhat more readily adjacent their inner peripheries than at their outer extremities, thus forming a wedge-shaped space not only in the circumferential direction but also transversely or radially of the thrust-receiving surface. This is desirable since it is the function of the rotating journal hub to throw the lubricant radially outward and, therefore, it is good to have the extra protection against the leakage of the lubricant at that side of the film which is at the outer periphery of the thrust member. Moreover, this construction allows the oil to enter the wedge more freely at the inner periphery of the member.

For the purpose of retaining the members 74 in proper position with relation to the housing, and to prevent rotation of these members, they are preferably held by two or more clamps which may be in the form of resilient or elastic metal plates 87, as best shown in Fig. 4. These plates are secured by bolts or screws 88 to suitable projections, indicated in Fig. 3, integral with the end bells 16. Portions 89 of the plates 87 are turned at right angles to the main body of the plates and are adapted to engage opposite sides of one of the necks 78 of the bearing member. It will be noted that the construction is such that a slight angling movement is permitted between the housing and the bearing members 74 so as to accommodate a slight misalinement of the shaft with respect to the housing. The spherical surfaces 72 and 73 permit this universal action while it is also permitted by the retaining plates 87. By so mounting the thrust members upon the end bells of the housing, the problem of assembly and disassembly of the unit is simplified. Moreover, the correct relationship of each member to its end bell is maintained at all times. This is particularly important when the thrust shifts from one side to the other. The relief of the thrust force on one end of the unit will not cause a dislocation of the related thrust member which, if permitted, might cause a binding of the parts.

Figure 7:
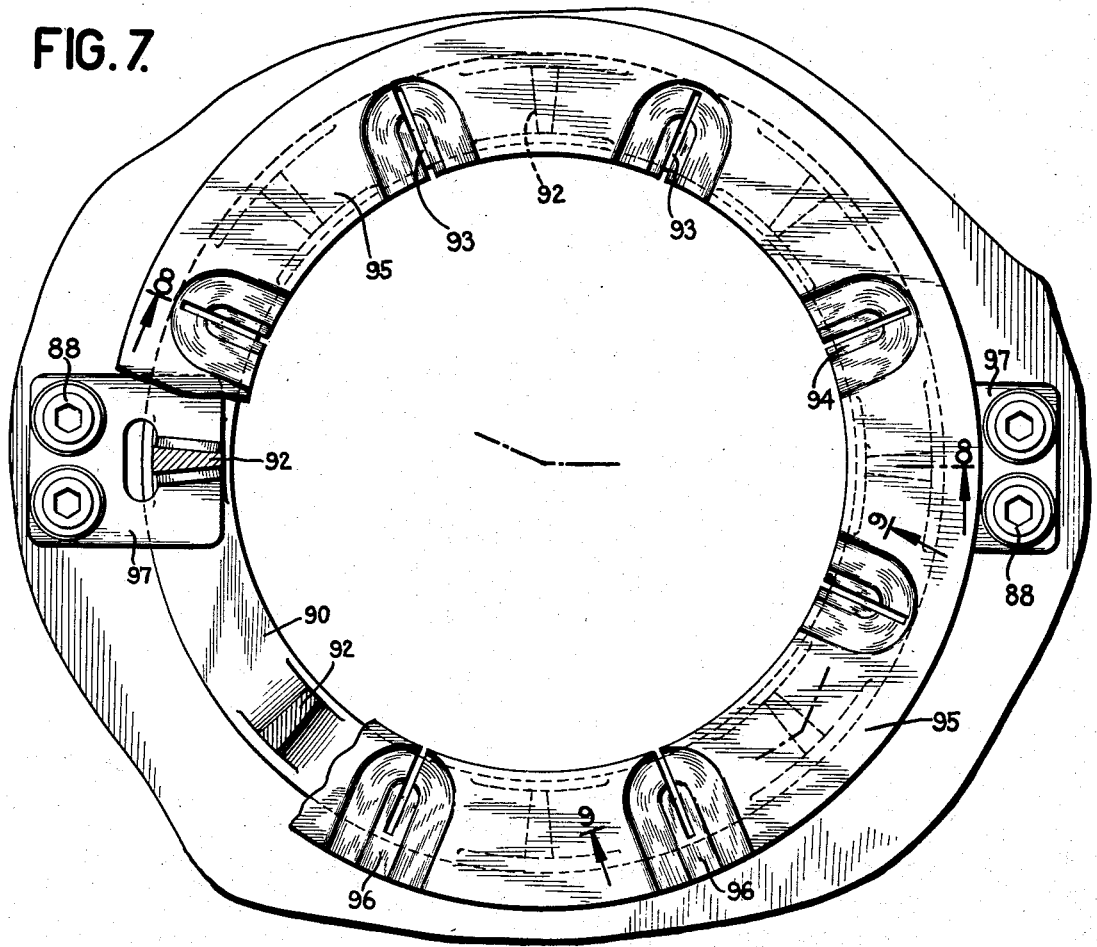
Fig. 7 is a view similar to Fig. 4, illustrating a modified form of thrust bearing member.
Figure 8:
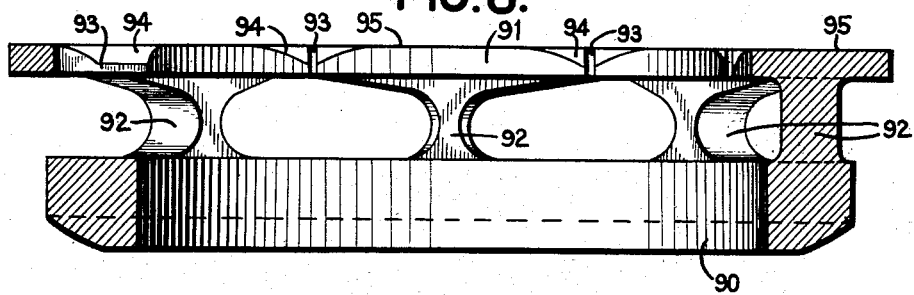
Fig. 8 is a section through the modified form of member, taken along the line 8—8 of Fig. 7.
Figure 9:
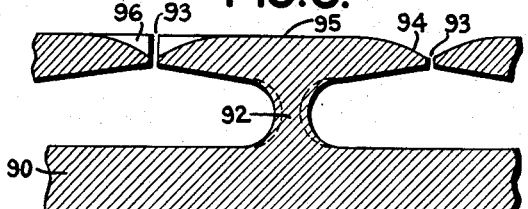
Fig. 9 is a fragmentary section through the member, taken along the line 9—9 of Fig. 7.

Referring now to Figs. 7, 8 and 9, there is shown a modification of the thrust bearing member. In lieu of forming the member with a steel base and a Babbitt lining for the bearing face, it may be formed completely of material having a desired resilience and at the same time having good bearing qualities. Thus, it may be formed completely of bronze. In this case the bearing member may have a base portion 90 similar to the portion 76 of the member first described and may have a thrust bearing portion 91 joined by a plurality of integral necks 92 with the base ring. The portion 91 may be provided with a series of radial slots 93 extending from the inner periphery about two-thirds of the distance across the portion 91. At the same time a series of depressions 94 may be provided in association with the slots, except the two lowermost, so as to provide passages for the ready access of the lubricant, delivered through centrifugal action, to the main surfaces 95 which are in bearing engagement with the sides of the journal hub. In line with the two lowermost slots 93, depressions 96 are provided which extend toward the outer, rather than the inner, periphery of the member. These, as in the first embodiment, allow for the picking up of the lubricant by the journal hub upon the creation of a suitable, negative pressure. Plates 97, similar to the plates 87, may be provided for retaining the modified bearing member in place. In the operation of the thrust bearing, this member will function in the same manner as the member 74 and differs from the latter member only in the fact that the slots 93 extend completely through the portion 91 and are not closed as are the slots 80 by the Babbitt lining of the member 74. This does not interfere materially with the supply of the lubricant. However, to avoid the possible sucking in of air through the slots 93, they may, if desired, be formed in such a way as to provide the required weakening but not extend completely through the portion 91, or they may be filled with some soft metal, such as solder.

Figure 10:
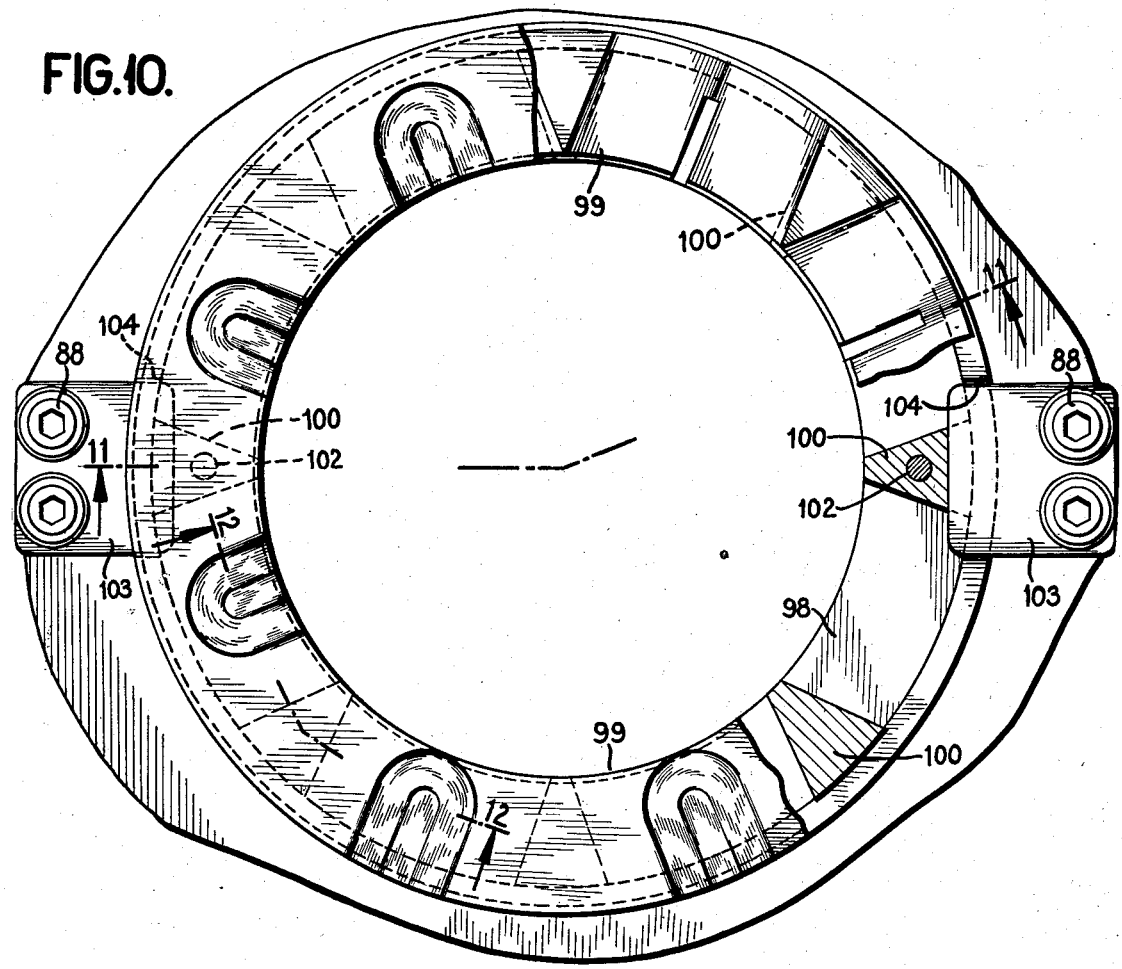
Fig. 10 is a view similar to Fig. 4 of a further form of thrust bearing member.
Figure 11:
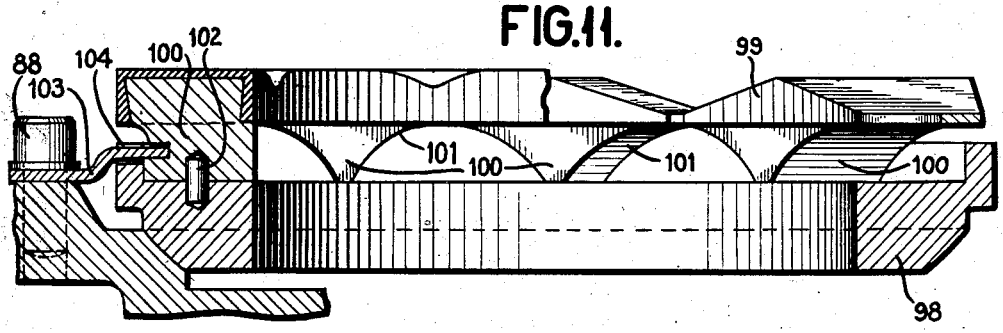
Fig. 11 is a section along the line 11—11 of Fig. 10.
Figure 12:
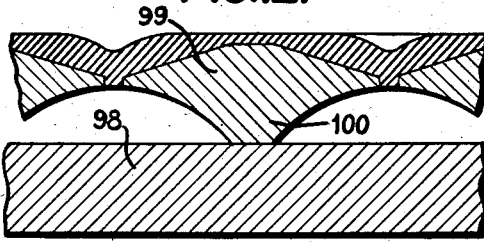
Fig. 12 is a fragmentary section along the line 12—12 of Fig. 10.

In Figs. 10, 11 and 12 there is shown a still further modification of the thrust bearing member. Here the member is shown as formed in two sections, 98 and 99. The section 98 is substantially the same as the base portions 76 and 90 of the previously described members. However, in lieu of the integral necks joining the base member with the flexible, sectional portion of the member, a series of projections or feet 100 is provided on the part 99, these being formed by a series of scallops 101. The ends of the feet 100 bear against the side of the ring 98 and permit the flexing of the several sections of the annular portion of the part 99 in substantially the same way as do the necks of the first-described member. The bearing face of the part 99 may be undulated and slotted and lined with Babbitt, like the portion 77 of member 74. Or, if desired, part 99 may be formed of bronze or the like and be made similar to the part 91 of the second embodiment. A pair of pins 102 may be provided in recesses formed in the parts 98 and 99 to prevent relative turning of these parts. A pair of retaining plates 103 may also be provided to retain the two parts of the modified thrust member in proper relation to the housing. These plates may be passed through openings or notches 104 in an axially extending flange of the base member 98 and may extend into circumferential grooves in the adjacent feet 100 of the member 99. It will be apparent that the plates serve to retain both of the parts 98 and 99 in desired relation to the end bell of the housing and to each other.

In Figs. 22 to 24, inclusive, there is shown a further modification of the unit in which the oil is distributed over the surface of the thrust member in a somewhat different manner. In this modified construction the journal hub 105 may be of the same construction as before. The inner, flexible bearing sleeve 106 which surrounds the journal hub may also be of substantially the same form as the sleeve 51 illustrated in Fig. 2. A thrust member 107 is provided which, in general, may be of a construction similar to the previously described thrust members, formed either entirely of a good bearing material, such as bronze, or formed of a steel base and provided with a Babbitt metal lining, or the like, on its bearing surface. In the drawings it is illustrated as being of the all bronze type.

The thrust-receiving portion of the member 107 is provided with a series of slits 108 extending radially from the inner periphery substantially three-quarters of the way across the face of the member. Seven of these slits may appropriately be provided, as illustrated in Fig. 22. Around each slit a groove or depression 109 may be formed in the bearing face of the member for the admission of oil to the wedge-shaped pocket formed between the adjacent section 110 of the inner bearing surface of the member and the side face of the journal hub 105. At the bottom of the thrust member there is provided, in lieu of a slit 108, a passage 111 which extends through the thrust receiving portion of the member from its inner bearing face to opening 112 between adjacent flexible necks 113. The passage 111 is considerably wider than the slits 108 but does not extend completely to the inner periphery of the thrust member; a small section of metal 111a (Fig. 23) remains. This relatively wide passage 111 provides for the free access of the lubricant in the reservoir at the bottom of the housing to the side of the journal hub.

The bearing face of the member 107 is grooved, as indicated at 114, completely around the same, the groove forming a pocket or channel which is open toward the shaft and is closed on one side by the journal hub 105 and on its opposite side by a radially extending flange 115 formed by the grooving of the bearing member. In the region of the passage 111 the groove 114 is enlarged, as indicated at 116 (Fig. 22), so as to encompass the entire passage.

The operation of this thrust bearing is as follows: As the hub rotates, its side face will pick up the lubricant, which is preferalby maintained at the normal oil level indicated in Fig. 22, and will carry it, due to viscous drag at low speeds aided by centrifugal action at high speeds, into and around the channel formed by groove 114 and from there it will be centrifugally forced radially outwardly into the depressions or grooves 109 from which it is supplied to the wedge-shaped pockets formed between the section 110 of the thrust bearing surface of member 107 and the side surface of the journal hub. The centrifugal force with which the oil is thrown insures the development of adequate pressure to distribute the oil effectively in the manner explained. Should the oil level in the reservoir drop completely below the inner periphery of the thrust member, but not below the minimum oil level indicated in Fig. 22, the lubricant flowing through the passage 111 will be picked up by the side face of the journal hub and carried into the channel 114 by a viscous pump action and thus insure adequate lubrication of the bearing. The level of the oil in the housing may, therefore, vary substantially from the minimum oil level to a point somewhat above the normal oil level indicated in Fig. 22.

Referring now to Figs. 25 to 27, inclusive, another method of insuring adequate lubrication of both the radial and thrust bearing surfaces is illustrated. The bearing in this modified construction may including an outer bearing sleeve 117 of the same character as the sleeve 47 of the first embodiment. The inner bearing sleeve 118 may also be substantially the same as the inner sleeve 51 of the first embodiment. However, in lieu of closing the outer sides of the circumferential grooves 119, as by means of the inwardly projecting flanges 62 of Fig. 18, these grooves are left open at their outer sides. Moreover, the openings 63 may be omitted entirely, if desired. The journal hub 120 is provided with a circumferentially extending groove 121 is each of its side faces. Each groove 121 is preferably disposed at an angle to the axis of the journal hub so as to form a pocket for the reception of the lubricant which flows into the groove over the edge 121a, which serves as a collector lip so long as the oil level is maintained above the minimum indicated in Fig. 26. The lubricant so collected is discharged under a fairly substantial pressure, due to centrifugal action, through a series of radial passages 122, only one of which is indicated in Fig. 26. Any suitable number of these passages may be provided. Three, spaced at 120° intervals, will be found quite satisfactory. At their outer ends these passages 122 communicate with the groove 119.

The outer side of each groove 119 is substantially closed by the bearing face 123 of a thrust member 124. At spaced intervals around the thrust member, preferably at each of the necks 123a (Fig. 27) which connects the bearing portion 123b of the thrust member with the base 123c, there is provided a radially extending passage 125. For convenience in manufacture these passages may originally extend from the outer periphery of the thrust member to substantially, but not quite, the inner periphery of this member. However, the outer ends of the passages are then closed by discs 126, which may be welded or otherwise secured in place. A relatively thin wall 127 is left between the inner end of the passage 125 and the inner periphery of the thrust member. So also, a relatively thin wall 128 is left, intermediate the ends of each passage 125, between this passage and the bearing face of the member 124. However, adjacent their outer and inner ends the passages 125 are placed in communication with the bearing face through openings 129 and 130, respectively. The openings 129 communicate with the groove 119 in the sleeve 118 and thus admit oil from the latter into the passages 125. This oil is in turn forced outwardly through the openings 130 into a circumferential groove 130a and delivered from the latter through the radial depressions or oil grooves to the wedge-shaped pockets formed between the surface 123 of the thrust member and the side face of the journal hub. The lubricant so delivered adjacent the inner periphery of the surface 123 is readily spread over the entire surface by the centrifugal action of the journal hub.

A modification of the construction illustrated in Figs. 22 to 24 is shown in Figs. 28 to 30, inclusive. The radial bearing portions of the modified unit may be of substantially the same construction as illustrated in Fig. 2. It may include an outer bearing sleeve 131, an inner flexible bearing sleeve 132 and a journal hub 133 secured to the shaft. Cooperating with the side of the journal hub and the side of the flexible sleeve 132 is a thrust member 134, preferably formed of bronze or other good bearing material. Like the thrust member of Figs. 22 to 24, the modified member comprises a base portion and a thrust-receiving bearing portion connected by integral, flexible necks with the base portion. The bearing portion is provided with a series of slits 135 extending from the inner periphery substantially three-quarters of the distance across the bearing face. These slits are provided at equally spaced intervals, with the exception that in lieu of such a slit at the bottom of the member, a large, triangular opening 136 is provided through the thrust bearing portion of the member. At each of the slits 135 there is formed a depression 137 which extends to the outer periphery of the journal hub and there terminates in an abrupt shoulder. Beyond the end of the slit there is provided a smaller depression 138 which extends to the outer periphery of the thrust member. This allows a freer circulation of the oil across the bearing face and assists in cooling the thrust member, which is particularly desirable in high speed installations. An annular channel extending completely around the bearing face of the member 134 is formed by a circumferential groove 139, which is spaced a slight distance from the inner periphery of the member. This leaves a rim 140 between the inner edge of the groove and the inner periphery of the member which serves to retain the oil within the channel more effectively than the groove 114 illustrated in Fig. 23. At the bottom of the bearing member the groove is expanded, as indicated at 141, to encompass the opening 136. In the operation of this thrust bearing the oil from the reservoir is brought against the side of the journal hub through the opening 136 and is carried by the rotating hub into the channel 139. From this channel the oil is distributed to the various wedge pockets through the grooves or depressions 137. Some of the excess oil passes through the depressions 138 to the outer periphery of the bearing member.

Mention has previously been made of the fact that the spherical surface 73 (Fig. 5) of the thrust member is preferably disposed at an angle of about 45° to the axis of the member if the most favorable condition for self-alinement is desired. It has also been mentioned that in certain constructions it is best to sacrifice the most favorable self-alinement conditions in order to minimize certain distorting forces acting upon the thrust member Elaborating upon these points, it may be stated that if the thrust member is of bi-metallic construction, i. e., primarily of steel but having a Babbitt metal lining over its bearing face, it is quite satisfactory to employ the 45° angle for the spherical surface 73. However, if the member is formed of a single metal of good bearing characteristics, such as bronze, the spherical surface is preferably disposed at a greater angle of, say, 60° to the axis of the member. This will be understood more clearly from the following analysis of the force conditions to which the thrust member is subjected.

Figure 31:
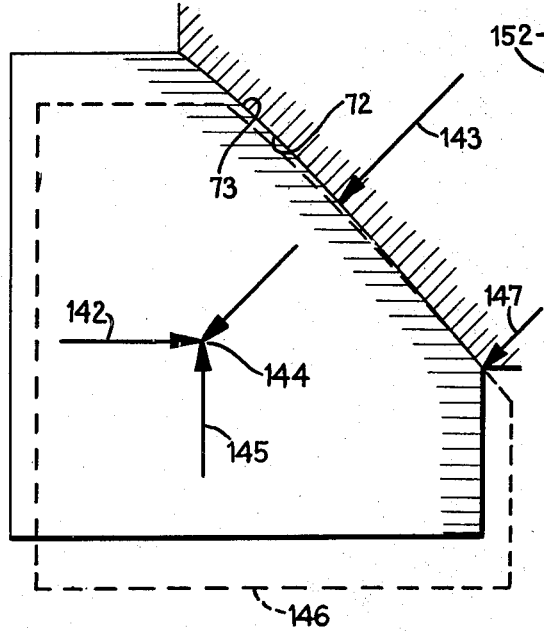

Referring to Fig. 31, there is indicated, diagrammatically, a cross-section of the base ring of the thrust member in its relation to the spherical seat of the end bell of the housing. The arrow 142 indicates the resultant thrust force imparted to the thrust member by the side of the journal hub at the particular cross-section indicated. This thrust force is met by a reaction force transmitted from the spherical seat of the housing to the spherical surface of the base ring. The resultant reaction force at the particular section indicated is represented by the arrow 143. Now, in order to avoid distortion in the way of twisting or curling of the base ring portion of the thrust member, it has been found desirable to so construct the thrust member that the point of intersection 144 of the resultant forces 142 and 143 falls at the center of area of the cross-section of the base ring. However, this has been found not to completely eliminate the curling or twisting effect upon the base ring due, apparently, to the fact that the force 143 has a radial component which is resisted by a radial reaction force, the resultant of which is indicated by the arrow 145, set up as a stress in the base ring. If the forces remained in the relation shown there would be no objectionable twisting action imparted to the base ring. However, the effect of the radial component of the force 143 is to compress and cause a slight contraction of the base ring. This contraction, in an exaggerated amount, is indicated in Fig. 31 by showing the compressed condition of the ring in broken lines at 146. It will be apparent that in shifting the spherical surface 73 of the ring radially inward, it will no longer have full-line contact (in cross-section) with the surface 72 but will tend to engage the latter surface only at the point indicated by the arrow 147. This, of course, sets up a twisting or curling action upon the base ring which tends to swing its surface 73 into full contact with the surface 72. At the same time this twisting action brings about a concentration of pressure at the inner periphery of the surface 73 of the thrust member.

When the thrust member is formed largely of steel, which has a relatively high modulus of elasticity, the contraction of the base ring and the tendency to twist it is not sufficiently great to cause any serious trouble. Moreover, the provision of the slits 80 (Fig. 4), and similar slits in the other forms of thrust member, tends to so increase the flexibility of the inner portion of the thrust receiving part of the member as to minimize the effect of the above indicated concentration of pressure. However, when the thrust member is formed of bronze or similar material, having a considerably lower modulus of elasticity, the tendency of the forces to twist the base ring is more serious and it therefore becomes desirable to adopt some expedient to offset this tendency.

Figure 32:
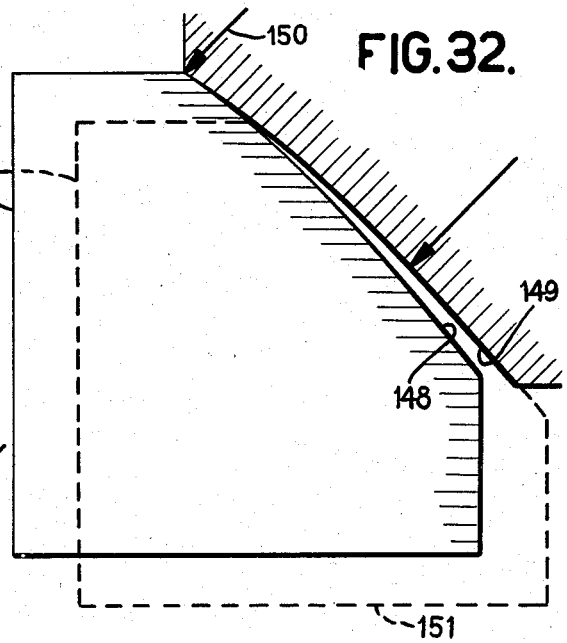

In Fig. 32 there is illustrated one scheme which might be employed to minimize the twisting or curling action upon the base ring. The construction here is such that the spherical surface of the thrust member, indicated in cross-section by the line 148, normally diverges from the spherical surface of the housing, indicated in cross-section by the line 149, from a point adjacent the outer periphery of the base ring. Under no-load or light-load conditions, therefore, contact between these surfaces is made only at the point indicated by the arrow 150. The amount of divergence between the two spherical surfaces is then preferably made such that under heavy-load conditions, when the ring is compressed to the position indicated schematically by the broken lines 151, the spherical surfaces will be brought into full contact without twisting of the base ring. Thus, under no-load conditions and under heavy-load conditions the thrust receiving surface of the member, which may be considered parallel with the surface 152, will be maintained in substantial parallelism with the side face of the journal hub. However, for loads intermediate no-load and heavy-load, a certain amount of twisting of the base ring to bring the lines 148 and 149 into full contact will be required and this will produce a concentration of pressure adjacent the outer periphery of the thrust receiving surface of the member. This arrangement, therefore, only partially corrects the difficulty and has the disadvantage of requiring great precision in the formation of the spherical surfaces, thus increasing the expense of the construction.

Figure 33:
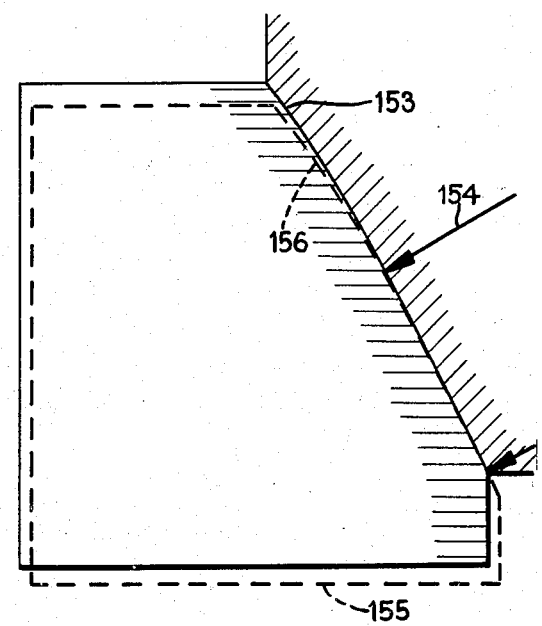

In Fig. 33 there is shown a more practical expedient for reducing the twisting or curling effect upon the base ring. This involves a reduction in the radial component of the reaction force by increasing the angle between the spherical surface and the axis of the member. Thus, the spherical surface 153 of the base ring is, in this case, disposed at an angle of about 60° to the axis of the member so that the radial component of the reaction force 154, imparted by the spherical seat of the housing, will be about 40% less than if a 45° angle were employed. Moreover, in this construction, as the base ring is compressed to the position indicated by the broken lines 155, its surface 153 will assume the broken line position indicated at 156, if we ignore the tendency of the ring to twist. It will be seen that the amount of twisting of the ring to bring the line 156 into full engagement with the seat is considerably less than in Figure 31, due not only to the smaller radial component of the reaction force but also to the smaller divergence between the curved surfaces when shifted relative to each other.

Figure 34:
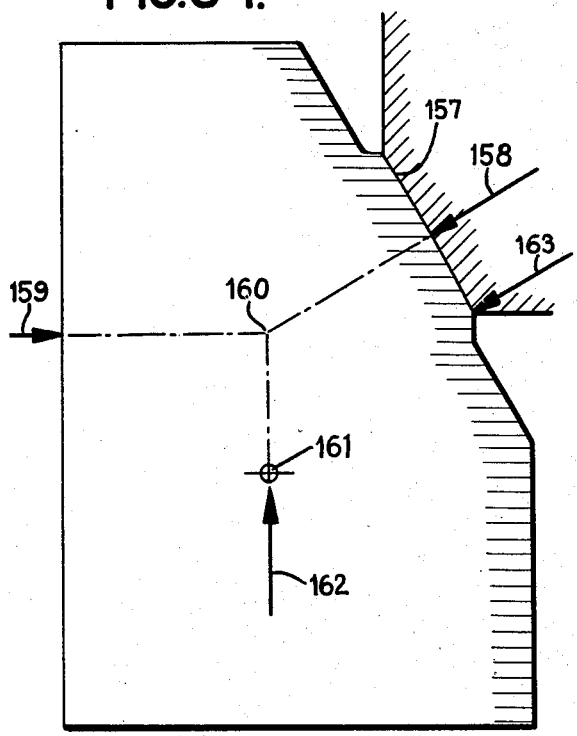

It has been found desirable in the construction of bearings provided with bronze thrust members, and particularly for heavy thrust loads, to provide the spherical surface of the base ring on a relatively narrow, raised band, as indicated at 157 in Fig. 34. This spherical surface is preferably inclined at an angle of about 60° to the axis of the member and it is so arranged that the resultant reaction force, indicated by the arrow 158, will intersect the resultant thrust force 159 at a point 160, which is in a radial plane passing through the center of area 161 of the particular cross-section of the base ring under consideration. Under light-load conditions, therefore, the forces 158 and 159, together with the radial stress force 162 set up in the ring, will so interact as not to impart any twisting moment to the base ring. When heavier loads are encountered, the base ring will, of course, tend to contract, as previously explained, and the reaction force from the housing will be imparted along the line indicated by the arrow 163. This will impart a slight turning moment or twist to the base ring but due to the small displacement of the force 163 with respect to the force 158, the twisting or curling tendency will not be great. It may be reduced to a minimum by making the band 157 only wide enough to take the load without subjecting the material to a compressive stress that would result in crushing the material. The concentration of pressure at the inner periphery of the bearing portion of the member, which results from the contraction of the base ring in this construction, manifesting itself in the twisting or curling of the base ring, is readily taken care of by the increased flexibility provided by the slitting of the thrust receiving portion of the member.

In connection with all of the constructions discussed, it is desirable to so dispose the flexible necks connecting the base ring with the thrust bearing portion of the member that the resultant thrust force, at any cross-section passing through the neck, will pass through the mean radial center line of the neck. This tends to avoid tilting of the thrust receiving portion of the member in a radial direction with respect to the base ring, which would result in the undue concentration of pressure at one of the edges.

Ordinarily, two or more bearings will be provided for the support of a rotating shaft. In utilizing bearings constructed in accordance with the present invention, it will usually be found desirable to provide one of the bearings with both the radial and the thrust bearing features which have been disclosed. The second bearing need, however, have only the radial bearing provisions and it is preferably so constructed. This provides a desired freedom of expansion or contraction of the shaft lengthwise in response to a change in temperature. It will be understood that the second bearing may be of the same construction as the first but with the thrust members omitted. Should the elongation and contraction of the shaft be considerable, the journal hub for the unit having merely the radial bearing may be made somewhat longer or wider.

To assist in the accurate location of the bearings in a machine, a cross 145 is preferably provided on the top, or at some other exposed point, of the housing, the intersection of the arms of the cross being accurately located directly above or opposite the axis of the journal and midway between the sides of the journal hub or of the outer bearing sleeve. If the correct distance between the center lines of the two journal hubs carried by a shaft to be supported is known, it is a relatively simple matter to first correctly position the housing of the bearing containing the radial and thrust provisions and to then locate the other bearing housing so that the intersection of the arms of its cross will fall precisely at the distance from the intersection of the arms of the cross on the first housing as that desired to be maintained between the center lines of the two journal hubs.

While a bearing unit embodying the invention and various modifications of certain features of the invention have been described in considerable detail, it will be understood that numerous other modifications may be made in the construction and arrangement of the several parts without departing from the general principles and scope of the invention. The terms and expressions employed herein have been used as terms of description and not of limitation.

What I claim is:
1. A bearing comprising a journal element having a cylindrical outer surface, a bearing member surrounding said journal element and having a substantially cylindrical surface cooperating with said cylindrical surface of said element, said member having a plurality of radially projecting portions dividing the member into a plurality of sections connected at their ends by weakened flexible portions of the member, and means surrounding said member adapted to engage the ends of said projecting portions to retain the member in its normal, untensioned condition, said weakened flexible portions being such as to enable the bearing surfaces of sections of said member to angle readily with relation to said journal element upon rotation of the journal element under load.

2. A bearing comprising a journal element having a cylindrical outer surface, a bearing member surrounding said journal element and having a substantially cylindrical surface cooperating with said cylindrical surface of said element, said member having a plurality of radially projecting portions dividing the member into a plurality of sections connected by weakened flexible portions of the member, and means surrounding said member adapted to engage the ends of said projecting portions to retain the member in its normal, untensioned condition, the ends of said projecting portions of said member and the engaging surface of said means surrounding said member being of spherical form and being shiftable relative to each other upon rotation of the journal element.

3. In a bearing a journal member having a smooth unbroken surface, a housing enclosing said journal member, an annular bearing member between said housing and journal member, and means for retaining said bearing member in substantially fixed relation to said housing but enabling slight relative angling movements between said housing and bearing member, said bearing member comprising a series of connected shoe elements presenting a substantially smooth surface cooperating with said smooth surface of said journal member, each of said shoe elements having a relatively rigid central body portion extending into a foot adapted to engage said retaining means and having flexible end portions at which said elements are inter-connected.

4. In a bearing a journal member having a smooth unbroken surface, a housing enclosing said journal member, an annular bearing member between said housing and journal member, and means for retaining said bearing member in substantially fixed relation to said housing but including cooperating spherical surfaces enabling slight relative angling movements between said housing and bearing member, said bearing member comprising a series of connected shoe elements presenting a substantially smooth surface cooperating with said smooth surface of said journal member, each of said shoe elements having a relatively rigid central body portion with an integral extension for spacing said shoe elements from said retaining means and having flexible end portions at which said elements are inter-connected.

5. In a bearing a journal member having a smooth unbroken surface, a housing enclosing said journal member, an annular bearing member between said housing and journal member, and means for retaining said bearing member in substantially fixed relation to said housing but including cooperating spherical surfaces enabling slight relative angling movements between said housing and bearing member, said bearing member comprising a series of connected shoe elements presenting a substantially smooth surface cooperating with said smooth surface of said journal member, each of said shoe elements having a relatively rigid central body portion with an integral extension for spacing said shoe elements from said retaining means and having flexible end portions at which said elements are inter-connected, said bearing member and the retaining means therefor being constructed and arranged to enable tilting of said shoe elements upon rotation of the journal member.

6. In a bearing a journal member having a smooth unbroken cylindrical surface, a housing enclosing said journal member, an annular bearing member between said housing and journal member, and means for retaining said bearing member in substantially fixed relation to said housing but enabling slight relative angling movements between said housing and bearing member, said bearing member comprising a series of connected shoe elements presenting a substantially smooth cylindrical surface cooperating with said smooth surface of said journal member, each of said shoe elements having a relatively rigid central body portion extending into a foot adapted to engage said retaining means and having flexible end portions at which said elements are inter-connected.

7. In a bearing a journal member having a smooth unbroken surface of revolution of a straight line, a housing enclosing said journal member, an annular bearing member between said housing and journal member, and means for retaining said bearing member in substantially fixed relation to said housing but enabling slight relative angling movements between said housing and bearing member, said bearing member comprising a series of connected shoe elements presenting a substantially smooth surface of revolution of a straight line cooperating with said smooth surface of said journal member, each of said shoe elements having a relatively rigid central body portion extending into a foot adapted to engage said retaining means and having flexible end portions at which said elements are inter-connected.

8. In a bearing a journal member having a smooth unbroken surface, a housing enclosing said journal member, an annular bearing member between said housing and journal member, and means for retaining said bearing member in substantially fixed relation to said housing but enabling slight relative angling movements between said housing and bearing member, said bearing member comprising a series of connected shoe elements presenting a substantially smooth surface cooperating with said smooth surface of said journal member, each of said shoe elements having a relatively rigid central body portion extending into a foot adapted to engage said retaining means and having flexible end portions at which said elements are inter-connected, said surface of said bearing member having a plurality of transversely extending grooves at the points of connection between said shoe elements.

9. In a bearing, a member adapted to transmit the load radially from a journal to a support which comprises a plurality of shoe sections each having a rigid central portion relatively thick in a radial direction and gradually decreasing in thickness toward relatively thin and flexible end portions, certain of said end portions being inter-connected to unite said sections into an integral member, the inner face of said member being substantially a smooth surface of revolution of a straight line and the outer surfaces of said central portions being curved in two dimensions and forming spaced portions of a single substantially spherical surface.

10. In a bearing, a member adapted to transmit the load radially from a journal to a support which comprises a plurality of shoe sections each having a rigid central portion relatively thick in a radial direction and gradually decreasing in thickness toward relatively thin and flexible end portions, certain of said end portions being interconnected to unite said sections into an integral member, the inner face of said member being substantially a smooth surface of revolution of a straight line but having a plurality of transversely extending grooves at the points of connection of said sections, and passages within the bearing surface for interconnecting said transversely extending grooves.

11. In a bearing, a member adapted to transmit the load from a journal to a support which comprises a plurality of shoe sections each having a relatively thick and rigid central portion and gradually decreasing in thickness toward relatively thin and flexible end portions, said end portions being inter-connected to form an annulus, the inner face of said member being substantially a smooth cylindrical surface but having a plurality of transversely extending grooves at the points of connection of said sections, said member having a passage extending through the same at one of said transversely extending grooves.

12. In a bearing, a member adapted to transmit the load from a journal to a support which comprises a plurality of shoe sections each having a relatively thick and rigid central portion and gradually decreasing in thickness toward relatively thin and flexible end portions, said end portions being inter-connected to form an annulus, the inner face of said member being substantially a smooth cylindrical surface but having a plurality of transversely extending grooves at the points of connection of said sections, said member having passages extending through the same at only a portion of said transversely extending grooves.

13. In a bearing, a member adapted to transmit the load from a journal to a support which comprises a metal sleeve having a plurality of spaced, radially extending projections on its outer face and a plurality of transversely extending grooves on its inner face intermediate said projections, the wall thickness of said sleeve decreasing gradually at either side of said projections toward the region of said grooves, the metal of said sleeve being sufficiently flexible adjacent said grooves to respond to oil pressures developed in the bearing, said sleeve having passages extending therethrough at only the lowermost of said grooves when the sleeve is in position.

14. In a bearing, a member adapted to transmit the load from a journal to a support which comprises a metal sleeve having a plurality of spaced, radially extending projections on its outer face and a plurality of transversely extending grooves on its inner face intermediate said projections, the wall thickness of said sleeve decreasing gradually at either side of said projections toward the region of said grooves, the metal of said sleeve being sufficiently flexible adjacent said grooves to respond to oil pressures developed in the bearing, said sleeve having passages extending through the same at at least one of said grooves and having at least one circumferential groove connecting said transversely extending grooves.

15. In a bearing, a member adapted to transmit the load from a journal to a support which comprises a metal sleeve having a plurality of spaced, radially extending projections on its outer face and a plurality of transversely extending grooves on its inner face intermediate said projections, the wall thickness of said sleeve decreasing gradually at either side of said projections toward the region of said grooves, the metal of said sleeve being sufficiently flexible adjacent said grooves to respond to oil pressures developed in the bearing, said sleeve having a circumferential groove connecting said transversely extending grooves and means for admitting a lubricant to at least one of said grooves.

16. In a bearing, a member adapted to transmit the load from a journal to a support which comprises a metal sleeve having a plurality of spaced, radially extending projections on its outer face and a plurality of transversely extending grooves on its inner face intermediate said projections, the wall thickness of said sleeve decreasing gradually at either side of said projections toward the region of said grooves, the metal of said sleeve being sufficiently flexible adjacent said grooves to respond to oil pressures developed in the bearing, said sleeve having a circumferential groove adjacent each end thereof communicating with said transversely extending grooves, certain of said transversely extending grooves terminating at said circumferential grooves and other of said transversely extending grooves extending completely across said sleeve.

17. In a bearing, a housing, a journal member within said housing having a cylindrical radial bearing surface and a substantially flat thrust bearing surface, a sleeve surrounding said journal member and normally retained by said housing in a condition to present a substantially cylindrical inner surface to said radial bearing surface, a plurality of grooves extending across said inner surface, a thrust bearing member normally having a substantially flat surface cooperating with said flat surface on the journal member and engaging the side of said sleeve, radially extending grooves in said thrust bearing member alined with the grooves in said sleeve, and means for retaining said thrust bearing member in substantially fixed relation to said housing, the construction and arrangement being such that the bearing faces of said sleeve and thrust member are flexed upon the rotation of the journal member to produce wedge-shaped film pockets in conjunction therewith, said grooves in said sleeve and thrust bearing member assisting in the delivery of lubricant to said film pockets.

18. In a bearing, a housing, a journal member within said housing having a cylindrical radial bearing surface and a substantially flat thrust bearing surface, a sleeve surrounding said journal member and normally retained by said housing in a condition to present a substantially cylindrical inner surface to said radial bearing surface, a plurality of grooves extending across said inner surface, a thrust bearing member normally having a substantially flat surface cooperating with said flat surface on the journal member and engaging the side of said sleeve, radially extending grooves in said thrust bearing member in predetermined relation to the grooves in the inner surface of said sleeve, and means for retaining said thrust bearing member in substantially fixed relation to said housing, the construction and arrangement being such that the bearing faces of said sleeve and thrust member are flexed upon the rotation of the journal member to produce wedge-shaped film pockets in conjunction therewith, said sleeve and thrust member being mounted for slight universal angling movement with respect to the housing.

19. In a bearing, a journal, a housing having a central section and two end sections arranged to provide a complete enclosure around said journal, a radial bearing member mounted in said central section and cooperating with the outer surface of said journal, and a thrust bearing member mounted in and removable as a unit with each of said end sections cooperating with surfaces on said journal contiguous to and disposed at an angle to said outer surface to transmit the end thrusts of said journal to said housing.

20. In a bearing, a journal, a housing having a central section and two end sections arranged to provide a complete enclosure around said journal, a radial bearing member mounted in said central section and cooperating with the outer surface of said journal, and a thrust bearing member mounted in and removable as a unit with each of said end sections cooperating with surfaces on said journal contiguous to and disposed at an angle to said outer surface to transmit the end thrusts of said journal to said housing, spherical seats and projections being provided between said radial and thrust bearing members and said housing to enable slight universal angling movements between said journal and housing.

21. In a bearing, a journal, a housing having a central section and two end sections arranged to provide a complete enclosure around said journal, a radial bearing member mounted in said central section around said journal, and a thrust bearing member mounted in and removable as a unit with each of said end sections to transmit the end thrusts of said journal to said housing, said radial and thrust bearing members being grooved and formed to provide sections flexibly connected and adapted to be tilted to produce wedge-shaped film pockets with surfaces on said journal, said thrust bearing members cooperating with the sides of said radial bearing member to assist in sealing the same against side leakage.

22. In a bearing, a horizontally disposed journal member having a smooth thrust-imparting surface, a housing surrounding said journal member, and a thrust bearing member for receiving relative thrusts between said surface and housing, said bearing member having an annular part varying gradually in thickness to provide a plurality of sections each having a relatively rigid, central body portion and relatively thin, flexible end portions by which the sections are integrally connected, a surface on said part of the bearing member opposite said surface on the journal member conforming substantially with said surface on the journal member when the journal is at rest, a plurality of grooves extending across said surface of the bearing member at the relatively thin portions thereof, and passages within the bearing surface for interconnecting said transversely extending grooves.

23. In a bearing, a journal member having a substantially vertical thrust-imparting surface, a housing surrounding said journal member, and a thrust bearing member for receiving relative thrusts between said surface and housing, said bearing member having a part varying gradually in thickness to provide a plurality of sections each having a relatively rigid, central body portion and relatively thin, flexible end portions by which the sections are integrally connected, a surface on said part of the bearing member opposite said surface on the journal member substantially parallel with said surface on the journal member when the journal is at rest, a plurality of grooves extending across said surface of the bearing member at the relatively thin portions thereof, said bearing member having a base part spaced from said first-mentioned part of said bearing member, and a plurality of slender, flexible necks firmly united with and projecting from the centers of said sections and firmly united with said base part, said necks enabling tilting of said sections with respect to said base part.

24. In a bearing, a journal member having a thrust-imparting surface, a housing surrounding said journal member, and a thrust bearing member for receiving relative thrusts between said surface and housing, said bearing member having an annular part varying gradually in thickness to provide a plurality of sections each having a relatively rigid, central body portion and relatively thin, flexible end portions by which the sections are integrally connected, said part being slit part way across the same at each of the points of connection between said sections, a surface on said part of the bearing member opposite said surface on the journal member conforming substantially with said surface on the journal member when the journal is at rest, a plurality of grooves extending across said surface of the bearing member at the relatively thin portions thereof, said bearing member having an annular base part spaced from said first-mentioned part of said bearing member, and a plurality of projections extending from the centers of said sections into engagement with said base part and arranged to enable tilting of said sections about the base part.

25. In a bearing, a journal member having a thrust-imparting surface, a housing surrounding said journal member, and a thrust bearing member for receiving relative thrusts between said surface and housing, said bearing member having an annular part varying gradually in thickness to provide a plurality of sections each having a relatively rigid, central body portion and relatively thin, flexible end portions by which the sections are integrally connected, said part being slit part way across the same at each of the points of connection between said sections, a surface on said part of the bearing member opposite said surface on the journal member being lined with soft bearing material conforming substantially with said surface of the journal member, the outer surface of said soft bearing material being grooved adjacent each of said slits.

26. In a bearing, a journal member having a thrust-imparting surface, a housing surrounding said journal member, and a thrust bearing member for receiving relative thrusts between said surface and housing, said bearing member having an annular part varying gradually in thickness to provide a plurality of sections each having a relatively rigid, central body portion and relatively thin, flexible end portions by which the sections are integrally connected, a surface on said part of the bearing member opposite said surface on the journal member conforming substantially with said surface on the journal member when the journal is at rest, and a plurality of grooves extending across said surface of the bearing member at the relatively thin portions thereof, certain of said grooves extending to the inner periphery of said annular part and other of said grooves extending to the outer periphery of said part.

27. In a bearing, a journal member having a thrust-imparting surface, a housing surrounding said journal member adapted to retain a lubricant, and a thrust bearing member for receiving relative thrusts between said surface and housing, said bearing member having an annular part varying gradually in thickness to provide a plurality of sections each having a relatively rigid, central body portion and relatively thin, flexible end portions by which the sections are integrally connected, a surface on said part of the bearing member opposite said surface on the journal member conforming substantially with said surface on the journal member when the journal is at rest and extending partly below the level of the lubricant in said housing, and a plurality of grooves extending across said surface of the bearing member at the relatively thin portions thereof, said grooves above the level of the lubricant extending to the inner periphery of said annular part and the grooves in the lower portion of said surface extending to the outer periphery of said part.

28. In a bearing, a journal member having a thrust-imparting surface, a housing surrounding said journal member, and a thrust bearing member for receiving relative thrusts between said surface and housing, said bearing member having an annular part varying gradually in thickness to provide a plurality of sections each having a relatively rigid, central body portion and relatively thin, flexible end portions by which the sections are integrally connected, a surface on said part of the bearing member opposite said surface on the journal member conforming substantially with said surface on the journal member when the journal is at rest, a plurality of grooves extending across said surface of the bearing member at the relatively thin portions thereof, and a circumferential groove in said surface of the bearing member communicating with at least a portion of said plurality of grooves.

29. In a bearing, a journal member having a thrust-imparting surface, a housing surrounding said journal member adapted to retain a lubricant, and a thrust bearing member for receiving relative thrusts between said surface and housing, said bearing member having an annular part varying gradually in thickness to provide a plurality of sections each having a relatively rigid, central body portion and relatively thin, flexible end portions by which the sections are integrally connected, a surface on said part of the bearing member opposite said surface on the journal member conforming substantially with said surface on the journal member when the journal is at rest and extending partly below the level of the lubricant in said housing, and a plurality of grooves extending across said surface of the bearing member at the relatively thin portions thereof, a circumferential groove in said surface of the bearing member communicating with each of said plurality of grooves, and a passage through said bearing member immersed in said lubricant and communicating with said circumferential groove.

30. In a bearing, a journal hub, a housing surrounding said hub and providing a reservoir adapted to retain a lubricant, a thrust member cooperating with a portion of the side of said journal hub, said member having a plurality of flexibly connected sections adapted to flex to provide wedge-shaped film pockets, said thrust member having a plurality of lubricant distributing grooves across its bearing face, and a circumferential groove at the inner periphery of said bearing face arranged to form a pocket with said journal hub for the reception of lubricant by centrifugal action from said hub, said circumferential groove communicating with said plurality of grooves for the delivery of lubricant to all of the same.

31. In a bearing, a journal hub, a housing surrounding said hub and providing a reservoir adapted to retain a lubricant, a thrust member cooperating with a portion of the side of said journal hub, said member having a plurality of flexibly connected sections adapted to flex to provide wedge-shaped film pockets, said thrust member having a plurality of lubricant distributing grooves across its bearing face, a circumferential groove adjacent the inner periphery of said bearing face communicating with said plurality of grooves for the delivery of lubricant to all of the same, and a passage extending through said thrust member at least partially beneath the oil level in said reservoir for delivering lubricant to said circumferential groove.

32. In a bearing, a journal hub, a housing surrounding said hub and providing a reservoir adapted to retain a lubricant, a thrust member cooperating with a portion of the side of said journal hub, said member having a plurality of flexibly connected sections adapted to flex to provide wedge-shaped film pockets, said thrust member having a plurality of slits extending part way across the bearing portion of said member from its inner periphery, a plurality of relatively large depressions in the bearing face of said member adjacent said slits, said depressions terminating inwardly of the outer periphery of said member but communicating therewith through smaller passages, a channel adjacent the inner periphery of the bearing face of said member communicating with said depressions, and a passage through said member at least partially beneath the oil level in said reservoir for delivering lubricant to said channel.

33. In a bearing a journal hub, a housing surrounding said journal hub and having a thrust-receiving seat therein, and a thrust member having a substantially continuous, curved portion with a bearing face cooperating with the side of said journal hub and having an integrally connected, substantially continuous, curved base portion spaced from said first mentioned portion with a surface cooperating with said thrust-receiving seat, the construction and arrangement being such that for any cross-section through said member the resultant thrust force imparted by said journal hub intersects the resultant reaction force imparted by said thrust-receiving seat at substantially the center of area of said base portion.

34. In a bearing a journal hub, a housing surrounding said journal hub and having a thrust-receiving seat therein, and a thrust member having a substantially continuous, curved portion with a bearing face cooperating with the side of said journal hub and having an integrally connected, substantially continuous, curved base portion spaced from said first mentioned portion with a surface cooperating with said thrust-receiving seat, the construction and arrangement being such that for any cross-section through said member the resultant thrust force imparted by said journal hub intersects the resultant reaction force imparted by said thrust-receiving seat substantially in a plane passing radially through the center of area of said base portion.

35. A bearing comprising a journal member having a cylindrical outer surface, a bearing member associated with said journal member and having a surface adjacent said cylindrical outer surface of substantially the same curvature when the bearing is not under load, said bearing member having a plurality of radially outwardly projecting portions forming relatively rigid main center parts of a plurality of sections, each of said sections having relatively flexible ends capable of flexing upon rotation of the journal under load to provide wedge-shaped pockets in conjunction with said outer surface, the plurality of sections being connected into an integral unit by said ends, and means engaging the ends of said outwardly projecting portions of said bearing member for retaining the same but enabling limited movement thereof.

36. In a bearing, a journal, a hub on said journal, a housing comprising a plurality of sections surrounding said journal, radial bearing means mounted in said housing and at least partially surrounding said hub, thrust bearing means surrounding said journal and cooperating with the ends of said hub and the sides of said radial bearing means and with portions of said housing, readily removable means for retaining said thrust bearing means in said housing, and means for securing said sections of the housing together to form a unitary structure.

GUSTAVE FAST.